(12) United States Patent
Hyun et al.

(10) Patent No.: US 11,808,711 B2
(45) Date of Patent: Nov. 7, 2023

(54) ULTRAFAST COLORIMETRIC HUMIDITY SENSOR AND METHOD OF PREPARING THE SAME

(71) Applicant: EWHA UNIVERSITY-INDUSTRY COLLABORATION FOUNDATION, Seoul (KR)

(72) Inventors: Jerome Kartham Hyun, Seoul (KR); Syazwani Mohd Noor, Seoul (KR); Han-Sol Jang, Seoul (KR); Jin-Ho Choy, Seoul (KR)

(73) Assignee: EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 17/750,475

(22) Filed: May 23, 2022

(65) Prior Publication Data

US 2022/0283096 A1    Sep. 8, 2022

Related U.S. Application Data

(60) Division of application No. 16/689,123, filed on Nov. 20, 2019, now Pat. No. 11,371,945, which is a continuation of application No. PCT/KR2019/014154, filed on Oct. 25, 2019.

(30) Foreign Application Priority Data

Nov. 23, 2018   (KR) .................. 10-2018-0146381

(51) Int. Cl.
*G01N 21/81*   (2006.01)
*G01N 21/78*   (2006.01)

(52) U.S. Cl.
CPC ............ *G01N 21/81* (2013.01); *G01N 21/78* (2013.01)

(58) Field of Classification Search
CPC .................................. G01N 21/78; G01N 21/81
USPC ........ 422/400, 402, 82.05; 436/39, 164, 165
See application file for complete search history.

(56) References Cited

U.S. PATENT DOCUMENTS

| | | | |
|---|---|---|---|
| 7,553,450 B2 | 6/2009 | Attar | |
| 8,673,237 B2 | 3/2014 | Schalkhammer | |
| 10,919,998 B2 | 2/2021 | Jung | |
| 11,371,945 B2 * | 6/2022 | Hyun | ............... G01N 21/81 |
| 2009/0035865 A1 | 2/2009 | DeMoor | |
| 2015/0122017 A1 | 5/2015 | Park | |
| 2015/0293028 A1 | 10/2015 | Kang | |

FOREIGN PATENT DOCUMENTS

| | | |
|---|---|---|
| KR | 10-2015-0117198 A | 10/2015 |
| KR | 10-2016-0120581 A | 10/2016 |
| KR | 101876942 B1 | 7/2018 |
| KR | 10-1782265 B1 | 9/2018 |

OTHER PUBLICATIONS

Jarulertwathana et al. ACS Applied Materials & Interfaces, vol. 13, pp. 44786-44796, Sep. 11, 2021.*
P.M. Faia et al., "Humidity sensing properties of a thick-film titania prepared by a slow spinning process," Sensors and Actuators B 101, pp. 183-190, Apr. 27, 2004.
Faculty for Chemistry and Pharmacy LMU Munich—Photonic crystals: New generation of ultra-thin moisture sensors, Oct. 22, 2018, 2 pages.
International Search Report of PCT/KR2019/014154 dated Feb. 3, 2020.
Hong Chi, et al "Highly Sensitive and Fast Response Colorimetric Humidity Sensors Based on Graphene Oxides Film", ACS Applied Materials and Interface 2015, vol. 7, issue 36, Aug. 25, 2015, pp. 19882-19886.
Zheng Li, "Nanoporous Silica-Dye Microspheres for Enhanced Colorimetric Detection of Cyclohexanone", MDPI, Chemosensors 2018, vol. 6, issue 34, Aug. 13, 2018, pp. 1-11.
Mohd-Noor et al, Journal of Materials Chemistry A, vol. 7., pp. 10561-10571, Apr. 3, 2019.
Alam et al, ACS Applied Materials & Interfaces, vol. 9, pp. 23941-23948, Jun. 27, 2017.

* cited by examiner

*Primary Examiner* — Maureen Wallenhorst
(74) *Attorney, Agent, or Firm* — Shih IP Law Group, PLLC.

(57) ABSTRACT

The present disclosure relates to a colorimetric humidity sensor and a method of preparing the same, and in the colorimetric humidity sensor that is an ultrafast colorimetric humidity sensor including a colorimetric member including humidity-responsive particles configured in a disordered monolayer arrangement on a substrate, the humidity-responsive particles are amorphous, porous, and polydispersed microspheres, and the colorimetric humidity sensor indicates a color change according to humidity upon light irradiation.

14 Claims, 34 Drawing Sheets

FIG. 1A(i)
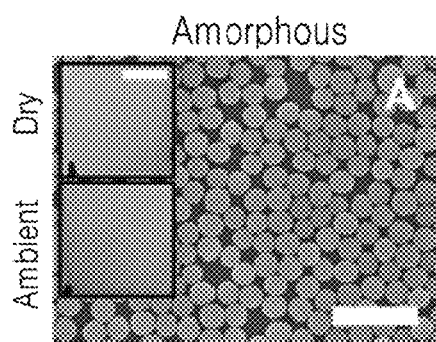
FIG. 1A(ii)
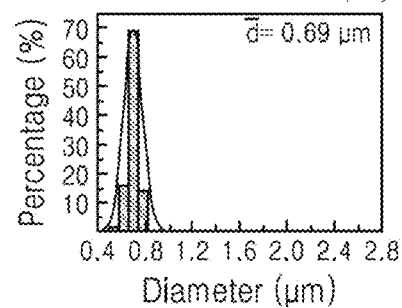
FIG. 1B(i)
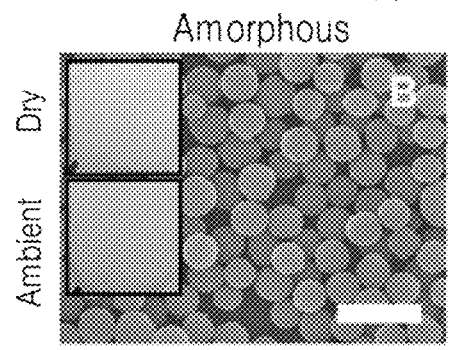
FIG. 1B(ii)
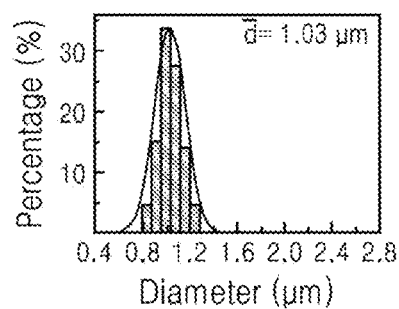

FIG. 1C(i)
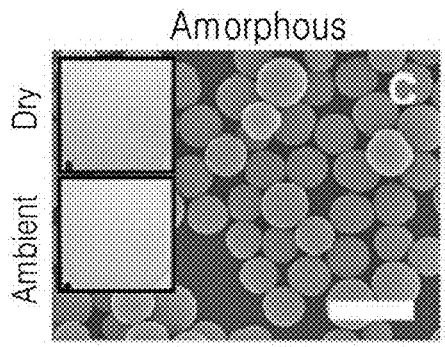
FIG. 1C(ii)
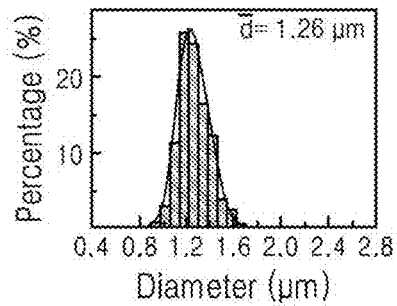
FIG. 1D(i)
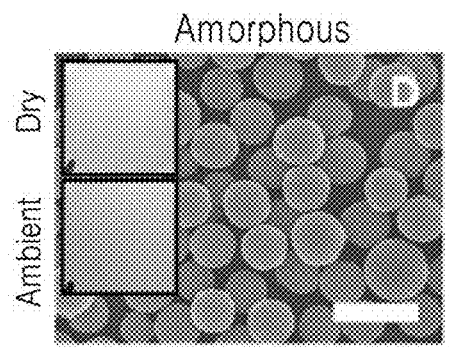
FIG. 1D(ii)
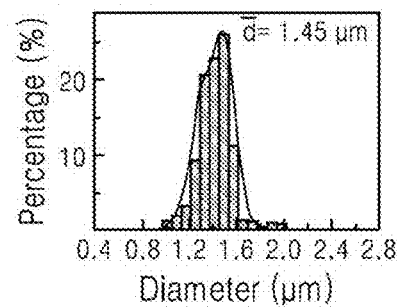

FIG. 1E(i)
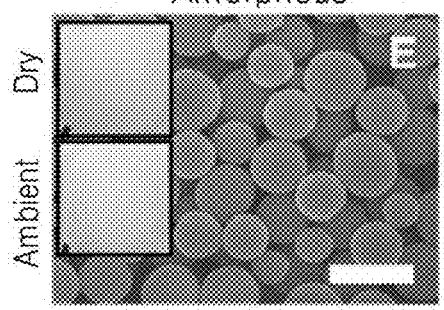
FIG. 1E(ii)
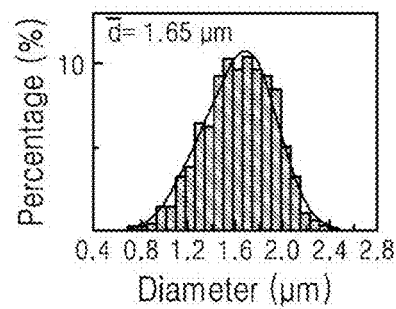
FIG. 1F(i)
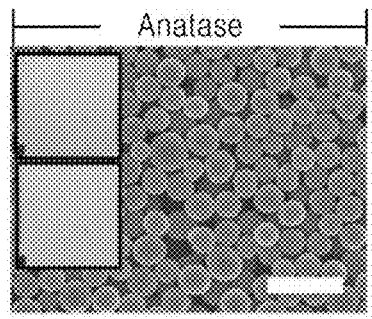
FIG. 1F(ii)
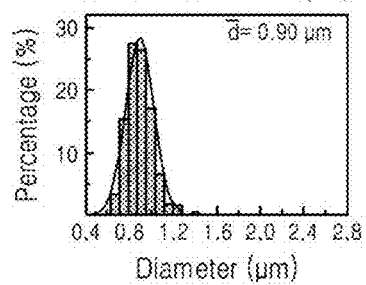

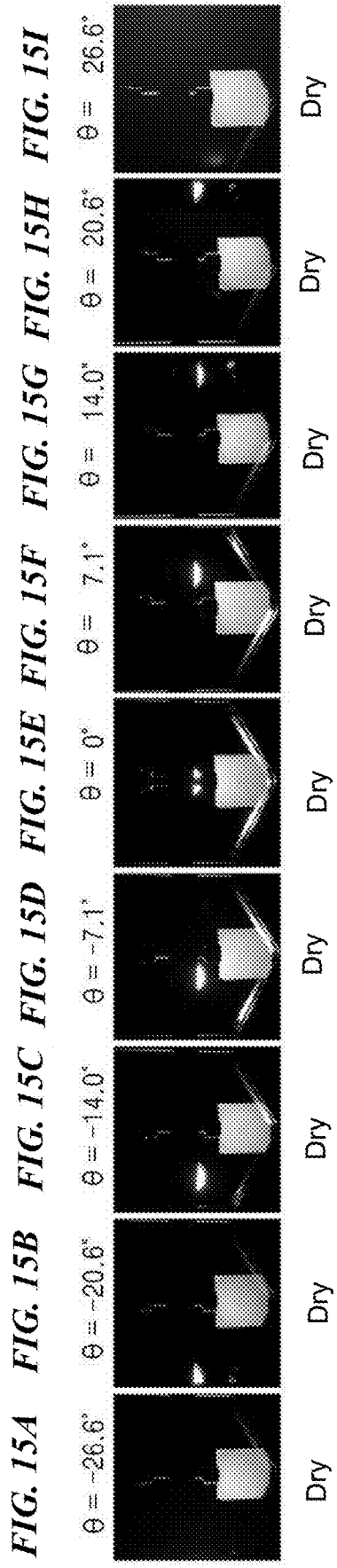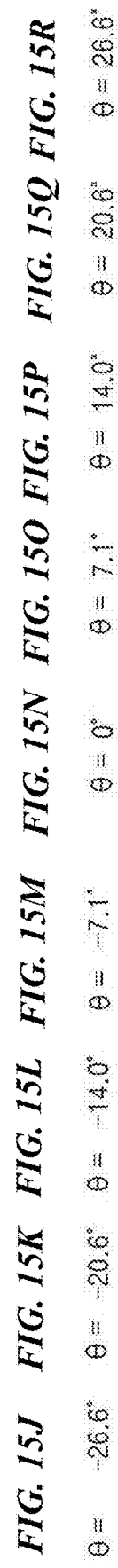

*FIG. 16A(i)*   *FIG. 16A(ii)*   *FIG. 16A(iii)*
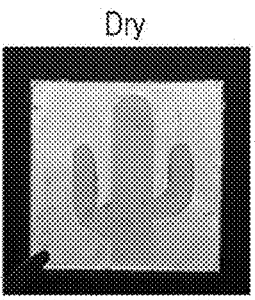 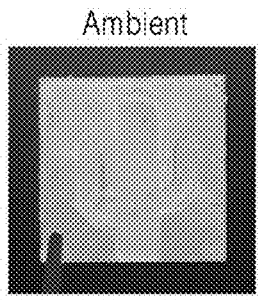 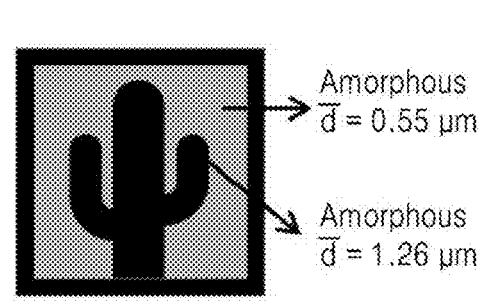
*FIG. 16B(i)*   *FIG. 16B(ii)*   *FIG. 16B(iii)*
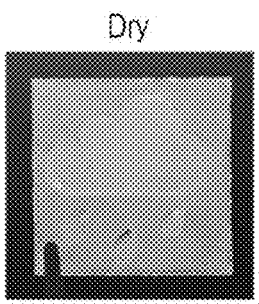 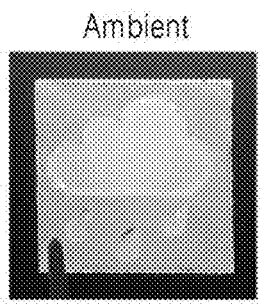 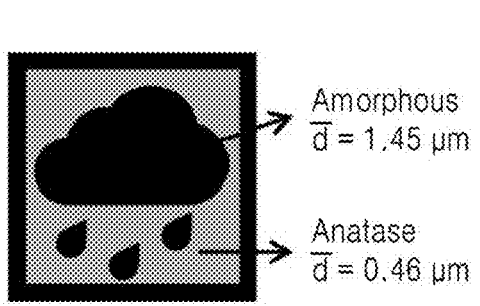

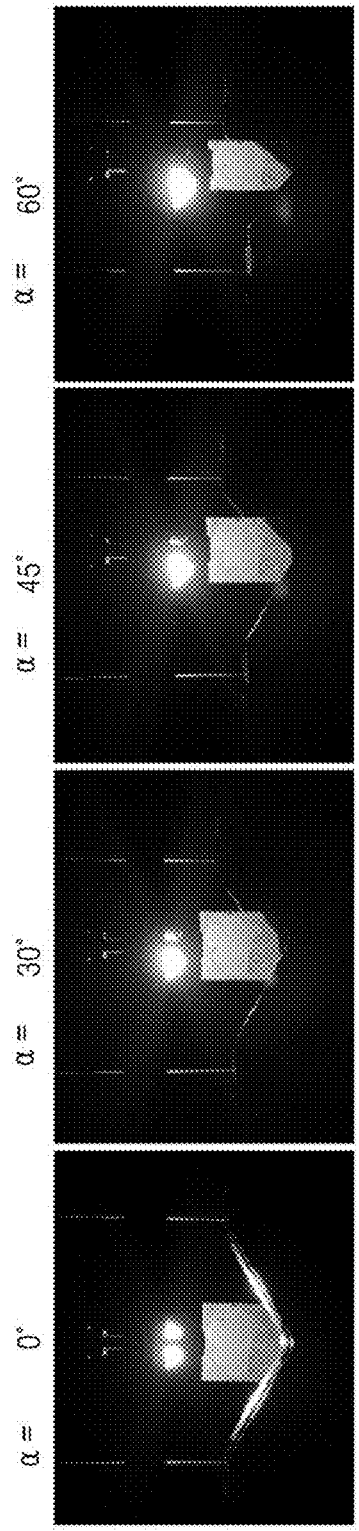
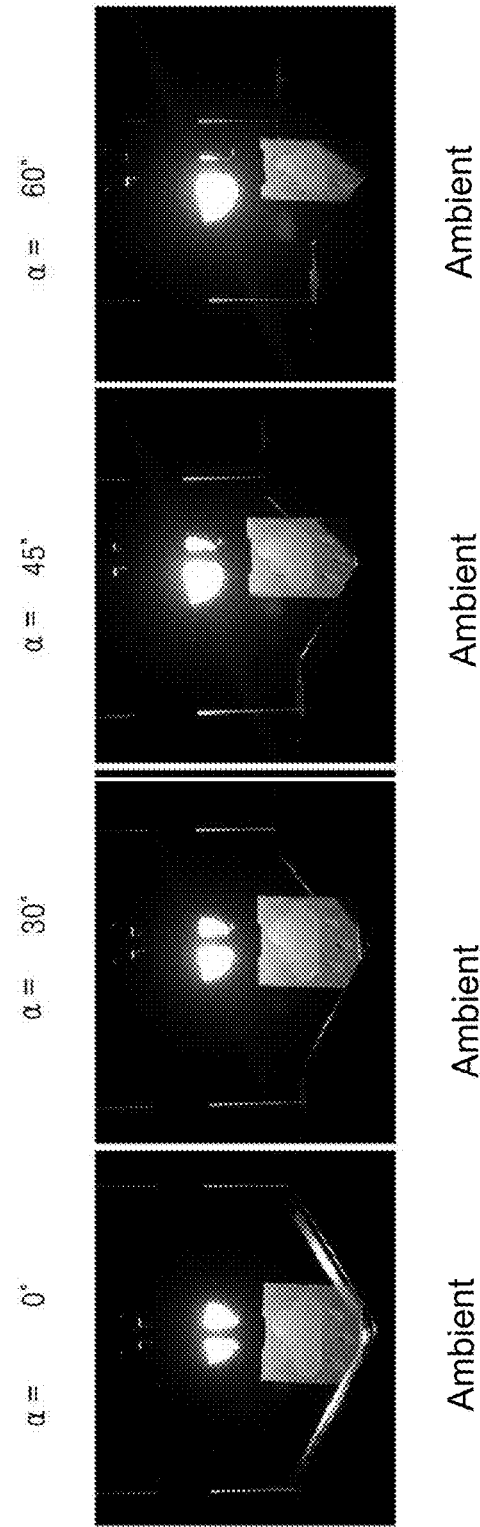

US 11,808,711 B2

ULTRAFAST COLORIMETRIC HUMIDITY SENSOR AND METHOD OF PREPARING THE SAME

CROSS-REFERENCE TO RELATED APPLICATIONS

This application is a divisional application of U.S. application Ser. No. 16/689,123 filed on Nov. 20, 2019, now U.S. Pat. No. 11,371,945, which is a continuation application of PCT Application No. PCT/KR2019/014154, filed on Oct. 25, 2019, which claims priority to Korean Patent Application Number 10-2018-0146381, filed on Nov. 23, 2018. The entire contents of the aforementioned related applications are incorporated herein by reference.

TECHNICAL FIELD

The present disclosure relates to an ultrafast colorimetric humidity sensor and a method of preparing the colorimetric humidity sensor.

BACKGROUND

Possibilities for replacing chemically produced colors with structural colors have gained substantial traction in display and sensing applications, as structural colors do not involve environmentally hazardous chemicals found in many synthetic pigments and dyes. Popular strategies for producing structural colors have involved ordered and uniform nano/microstructures using dielectric or plasmonic materials. However, production of these structures generally requires top-down clean-room fabrication methods, which are expensive and time-consuming. Solution-based methods on the other hand are cheap, simple and scalable, but generally produce structures that lack spatial order and exhibit a degree of polydispersity. It is therefore desirable to create structural colors from systems that tolerate disorder and non-uniformity, as solution-based methods can open up practical pathways for implementation. The present inventors have previously demonstrated disordered structural colors from a random arrangement of polydispersed, crystalline $TiO_2$ microspheres, synthesized through a simple hydrothermal method and annealing step. G. Shang et al. also theoretically investigated structural colors from randomly arranged monodispersed particles with optimized geometries for color saturation control. Due to the ease and cheap costs associated with preparing such systems, a broad range of opportunities in colorimetric applications based on disordered structural colors remains open for exploration. One area of impact that has not been investigated but holds strong potential is in optical humidity sensing.

Humidity sensing represents an indispensable technology for managing product quality in a wide range of industries including meteorological, electronics, medicine, food science, and semiconductors. Of the many types of humidity sensing platforms, colorimetric sensing provides a simple, visual approach for gauging the relative humidity. Various colorimetric systems have been demonstrated with nanostructures including graphene oxide, porphyrin-clay composites, and polymer electrolytes.

PRIOR ART DOCUMENT

[Non-Patent Document] Shang, G. et al., Photonic Glass for High Contrast Structural Color, Scientific Reports, 2018, 8, 7804

DISCLOSURE OF THE INVENTION

Problems to be Solved by the Invention

The present disclosure provides an ultrafast colorimetric humidity sensor and a method of preparing the colorimetric humidity sensor that includes a colorimetric member including humidity-responsive particles configured in a disordered monolayer arrangement on a substrate, and the humidity-responsive particles are amorphous, porous, and polydispersed microspheres and the colorimetric humidity sensor indicates a color change according to humidity upon light irradiation.

However, problems to be solved by the present disclosure are not limited to the above-described problems. Although not described herein, other problems to be solved by the present disclosure can be clearly understood by a person with ordinary skill in the art from the following descriptions.

Means for Solving the Problems

A first aspect of the present disclosure provides a colorimetric humidity sensor including a colorimetric member including humidity-responsive particles configured in a disordered monolayer arrangement on a substrate, and the humidity-responsive particles are amorphous, porous, and polydispersed microspheres, and the colorimetric humidity sensor indicates a color change according to humidity upon light irradiation.

A second aspect of the present disclosure provides a method of preparing a colorimetric humidity sensor, including: synthesizing amorphous microspheres by a non-aqueous solvothermal method to prepare humidity-responsive particles; and coating the humidity-responsive particles in a monolayer on a substrate to form a colorimetric member.

Effects of the Invention

According to embodiments of the present disclosure, humidity-responsive structural colors from a random arrangement of amorphous microspheres are demonstrated. Through a comprehensive suite of characterization methods and optical analysis using effective medium theory, it is shown that a large fraction of the amorphous titania microsphere is microporous, permitting significant changes to the effective permittivity upon water uptake. Individually the microspheres are indistinguishable by scattered light in dry and humid environments, but the microspheres display color contrast in the both environments as the superposition of the individual scattering spectra, determined by the polydispersed size distribution and effective permittivity, exposes smoothly varying spectral features unique to the humid environment. The correlation between pore volume filling by water and spectral change enables the water uptake amount by the microspheres to be attained optically using a fraction of material and time required by conventional gravimetric analysis. Lack of spatial order for color generation also facilitates the fabrication of a simple binary humidity-responsive display, optimized in speed and signal at only a monolayer coverage of particles. Such results suggest intriguing possibilities for realizing cheap, simple and efficient colorimetric humidity sensors using structural colors from disordered systems.

According to embodiments of the present disclosure, reflectivity changes of the material due to moisture-induced volume swelling alters the material color, demonstrating the involvement of optical, physicochemical and mechanical processes. Although the combination of these mechanisms provides large colorimetric ranges, the swelling process limits the response time to a range of hundreds of milliseconds to a few minutes. A colorimetric system that does not involve volume swelling but only optical and diffusive mechanisms, in principle, could offer faster response rates.

According to embodiments of the present disclosure, demonstrated is a fast, humidity-sensitive colorimetric system using disordered structural colors in the form of randomly arranged amorphous, polydispersed titania microspheres. Although the microspheres individually exhibit a noisy scattering spectrum in the visible range, their ensemble collectively displays a smoothly varying scattering spectrum that translates to an optimally saturated color. Because scattering from the microspheres is incoherent, the total scattering cross section in the far field can be expressed as the sum of individual scattering cross sections generated by every particle. This washes out the spectral noise and exposes smoothly varying features in the total scattering spectrum. The microspheres are characterized by a large porosity that, when occupied by water vapor, changes the effective refractive index of the system. The present inventors exploit the strong correlation between pore volume filling and spectral change to extract the water uptake amount using only a fraction of sample and time required by conventional gravimetric analysis. The particles of the present disclosure show moderately reversible characteristics and rapid response speeds (about 30 ms). Finally, the present disclosure describes, through spin-coating, a binary humidity display optimized in color saturation with only a monolayer coverage of humidity responsive and unresponsive microspheres.

BRIEF DESCRIPTION OF THE DRAWINGS

FIG. 1A (i) shows amorphous titania particle set labelled as A representing size distributions as shown in FIG. 1A (ii) with average diameter of 0.69 μm according to Example of the present disclosure. FIG. 1B (i) shows amorphous titania particle set labelled as B representing size distributions as shown in FIG. 1B (ii) with average diameter of 1.03 μm according to Example of the present disclosure. FIG. 1C (i) shows amorphous titania particle set labelled as C representing size distributions as shown in FIG. 1C (ii) with average diameter of 1.26 μm according to Example of the present disclosure. FIG. 1D (i) shows amorphous titania particle set labelled as D representing size distributions as shown in FIG. 1D (ii) with average diameter of 1.45 μm according to Example of the present disclosure. FIG. 1E (i) shows amorphous titania particle set labelled as E representing size distributions as shown in FIG. 1E (ii) with average diameter of d 1.65 μm according to Example of the present disclosure. Herein, FIGS. 1A (i), 1B (i), 1C (i), 1D (i), and 1E (i) are FE-SEM images of particles (scale bar: 2 μm), the insets are photographs illustrating forward-scattered colors from spin-coated particle sets on glass substrate under dry (top) and ambient (bottom) conditions (scale bar: 1 cm), and FIGS. 1A (ii), 1B (ii), 1C (ii), 1D (ii), and 1E (ii) are measured size distribution of the microspheres with 0.08 μm-sized bins and the solid curves represent normal fits to the distribution.

FIG. 1F (i) shows an anatase particle set representing size distributions as shown in FIG. 1F (ii) with an average diameter of 0.9 μm according to Comparative Example. Herein, FIG. 1F (i) is FE-SEM image of particles (scale bar: 2 μm), the inset is photographs illustrating forward-scattered colors from spin-coated particle set on glass substrate under dry (top) and ambient (bottom) conditions (scale bar: 1 cm), and FIG. 1F (ii) is measured size distribution of the microspheres with 0.08 μm-sized bins and the solid curve represents normal fits to the distribution.

FIGS. 15A-15R show photographs of the amorphous D set obtained at several illumination angles, showing angle-dependent color variation for dry (top, FIGS. 15A-15I) and ambient humidity (bottom, FIGS. 15J-15R)) conditions according to Example of the present disclosure.

FIGS. 16A (i)-16A (iii) show photographs of humidity-responsive displays that are activated under dry (cactus icon) condition according to Example of the present disclosure, and the right image (FIG. 16A (iii)) describes the composition of the icon image and background. FIGS. 16B (i)-16B (iii) show photographs of humidity-responsive displays that are activated under ambient humidity (rainy cloud icon) condition according to Example of the present disclosure, and the right image (FIG. 16B (iii)) describes the composition of the icon image and background.

FIGS. 18A-18H show photographs of a rainy cloud display rotated to 0°, 30°, 45° and 60° under dry (top, FIGS. 18A-18D) and ambient humidity (bottom, FIGS. 18E-18H) conditions according to Example of the present disclosure.

BEST MODE FOR CARRYING OUT THE INVENTION

Figure 2A:
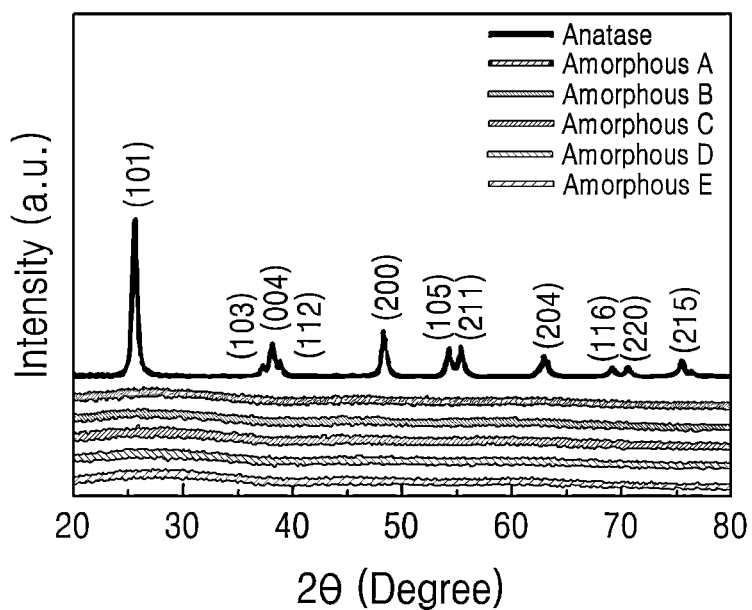
FIG. 2A shows structural phase from powder XRD of anatase, and amorphous A, B, C, D, and E sets according to Example of the present disclosure.

Hereafter, embodiments and examples will be described in detail with reference to the accompanying drawings so that the present disclosure may be readily implemented by a person with ordinary skill in the art. However, it is to be noted that the present disclosure is not limited to the embodiments and examples but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected to" another element and an element being "electronically connected to" another element via another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereafter, embodiments of the present disclosure will be described in detail, but the present disclosure may not be limited thereto.

A first aspect of the present disclosure provides a colorimetric humidity sensor including a colorimetric member including humidity-responsive particles configured in a disordered monolayer arrangement on a substrate, and the humidity-responsive particles are amorphous, porous, and polydispersed microspheres, and the colorimetric humidity sensor indicates a color change according to humidity upon light irradiation.

In an embodiment of the present disclosure, the humidity-responsive particles may include at least one oxides, but may not be limited thereto. In an embodiment of the present disclosure, the humidity-responsive particles may include at least one oxides selected from $SiO_2$, $TiO_2$, $BaTiO_3$, ZnO, $Ta_2O_3$, $Nb_2O_3$, CaO, $Li_2O$, $SnO_2$, $Sb_2O_3$, $Sb_2O_4$, $As_2O_3$, $SrTiO_3$, $PbTiO_3$, and $CaTiO_3$, but may not be limited thereto.

In an embodiment of the present disclosure, the colorimetric member may indicate a different color according to an average diameter of the humidity-responsive particles. According to an embodiment of the present disclosure, the average diameter of the humidity-responsive particles may be from about 0.05 μm to 10 μm, but may not be limited thereto. For example, the average diameter of the humidity-responsive particles may be from about 0.05 μm to about 10 μm, from about 0.05 μm to about 9 μm, from about 0.05 μm to about 8 μm, from about 0.05 μm to about 7 μm, from about 0.05 μm to about 6 μm, from about 0.05 μm to about 5 μm, from about 0.05 μm to about 4 μm, from about 0.05 μm to about 3 μm, from about 0.05 μm to about 2 μm, from about 0.05 μm to about 1 μm, from about 0.05 μm to about 0.5 μm, from about 0.05 μm to about 0.2 μm, from about 0.05 μm to about 0.1 μm, from about 0.1 μm to about 10 μm, from about 0.1 μm to about 9 μm, from about 0.1 μm to about 8 μm, from about 0.1 μm to about 7 μm, from about 0.1 μm to about 6 μm, from about 0.1 μm to about 5 μm, from about 0.1 μm to about 4 μm, from about 0.1 μm to about 3 μm, from about 0.1 μm to about 2 μm, from about 0.1 μm to about 1 μm, from about 0.1 μm to about 0.5 μm, from about 0.1 μm to about 0.2 μm, from about 0.2 μm to about 10 μm, from about 0.2 μm to about 9 μm, from about 0.2 μm to about 8 μm, from about 0.2 μm to about 7 μm, from about 0.2 μm to about 6 μm, from about 0.2 μm to about 5 μm, from about 0.2 μm to about 4 μm, from about 0.2 μm to about 3 μm, from about 0.2 μm to about 2 μm, from about 0.2 μm to about 1 μm, from about 0.2 μm to about 0.5 μm, from about 0.5 μm to about 10 μm, from about 0.5 μm to about 9 μm, from about 0.5 μm to about 8 μm, from about 0.5 μm to about 7 μm, from about 0.5 μm to about 6 μm, from about 0.5 μm to about 5 μm, from about 0.5 μm to about 4 μm, from about 0.5 μm to about 3 μm, from about 0.5 μm to about 2 μm, from about 0.5 μm to about 1 μm, from about 1 μm to about 10 μm, from about 1 μm to about 9 μm, from about 1 μm to about 8 μm, from about 1 μm to about 7 μm, from about 1 μm to about 6 μm, from about 1 μm to about 5 μm, from about 1 μm to about 4 μm, from about 1 μm to about 3 μm, from about 1 μm to about 2 μm, from about 2 μm to about 10 μm, from about 2 μm to about 9 μm, from about 2 μm to about 8 μm, from about 2 μm to about 7 μm, from about 2 μm to about 6 μm, from about 2 μm to about 5 μm, from about 2 μm to about 4 μm, from about 2 μm to about 3 μm, from about 3 μm to about 10 μm, from about 3 μm to about 9 μm, from about 3 μm to about 8 μm, from about 3 μm to about 7 μm, from about 3 μm to about 6 μm, from about 3 μm to about 5 μm, from about 3 μm to about 4 μm, from about 4 μm to about 10 μm, from about 4 μm to about 9 μm, from about 4 μm to about 8 μm, from about 4 μm to about 7 μm, from about 4 μm to about 6 μm, from about 4 μm to about 5 μm, from about 5 μm to about 10 μm, from about 5 μm to about 9 μm, from about 5 μm to about 8 μm, from about 5 μm to about 7 μm, from about 5 μm to about 6 μm, from about 6 μm to about 10 μm, from about 6 μm to about 9 μm, from about 6 μm to about 8 μm, from about 6 μm to about 7 μm, from about 7 μm to about 10 μm, from about 7 μm to about 9 μm, from about 7 μm to about 8 μm, from about 8 μm to about 10 μm, from about 8 μm to about 9 μm, or from about 9 μm to about 10 μm, but may not be limited thereto.

Further, in an embodiment of the present disclosure, the humidity-responsive particles may have a size distribution of from about 0.2 μm to about 2 μm, but may not be limited thereto. For example, the humidity-responsive particles may have a size distribution of from about 0.2 μm to about 2 μm, from about 0.2 μm to about 1.8 μm, from about 0.2 μm to about 1.6 μm, from about 0.2 μm to about 1.4 μm, from about 0.2 μm to about 1.2 μm, from about 0.2 μm to about 1 μm, from about 0.2 μm to about 0.8 μm, from about 0.2 μm to about 0.6 μm, from about 0.2 μm to about 0.4 μm, from about 0.4 µm to about 2 µm, from about 0.6 µm to about 2 µm, from about 0.8 µm to about 2 µm, from about 1 µm to about 2 µm, from about 1.2 µm to about 2 µm, from about 1.4 µm to about 2 µm, from about 1.6 µm to about 2 µm, or from about 1.8 µm to about 2 µm, but may not be limited thereto.

In an embodiment of the present disclosure, an average size of pores in the humidity-responsive particles may be from about 1 nm to about 60 nm, but may not be limited thereto. For example, the average size of the pores in the humidity-responsive particles may be from about 1 nm to about 60 nm, from about 1 nm to about 50 nm, from about 1 nm to about 40 nm, from about 1 nm to about 30 nm, from about 1 nm to about 20 nm, from about 1 nm to about 10 nm, from about 1 nm to about 5 nm, from about 5 nm to about 60 nm, from about 10 nm to about 60 nm, from about 20 nm to about 60 nm, from about 30 nm to about 60 nm, from about 40 nm to about 60 nm, or from about 50 nm to about 60 nm, but may not be limited thereto.

In an embodiment of the present disclosure, the disordered monolayer arrangement of the humidity-responsive particles formed on the substrate may be formed by arranging the amorphous and porous microspheres into a monolayer having a polydispersed size distribution ranging from about 0.05 µm to about 10 µm or from about 0.2 µm to about 2 µm.

In an embodiment of the present disclosure, the humidity-responsive particles have pores, and a porosity of the humidity-responsive particles may be from about 20% to about 70%, but may not be limited thereto. For example, the porosity of the humidity-responsive particles may be from about 20% to about 70%, from about 20% to about 60%, from about 20% to about 50%, from about 20% to about 40%, from about 20% to about 30%, from about 30% to about 70%, from about 40% to about 70%, from about 50% to about 70%, or from about 60% to about 70%, but may not be limited thereto.

In an embodiment of the present disclosure, the colorimetric humidity sensor shows a faster response than a conventional humidity sensor, and for example, a response time of the colorimetric humidity sensor may be from about 0.1 µs to about 500 ms, but may not be limited thereto. For example, the response time of the colorimetric humidity sensor may be from about 0.1 µs to about 500 ms, from about 0.1 µs to about 400 ms, from about 0.1 µs to about 300 ms, from about 0.1 µs to about 200 ms, from about 0.1 µs to about 100 ms, from about 0.1 µs to about 10 ms, from about 0.1 µs to about 1 ms, from about 0.1 µs to about 500 µs, from about 0.1 µs to about 100 µs, from about 0.1 µs to about 10 µs, from about 0.1 µs to about 1 µs, from about 1 µs to about 500 ms, from about 10 µs to about 500 ms, from about 100 µs to about 500 ms, from about 500 µs to about 500 ms, from about 1 ms to about 500 ms, from about 10 ms to about 500 ms, from about 10 ms to about 50 ms, from about 100 ms to about 500 ms, from about 200 ms to about 500 ms, from about 300 ms to about 500 ms, or from about 400 ms to about 500 ms, but may not be limited thereto.

In an embodiment of the present disclosure, the colorimetric humidity sensor may further include humidity-unresponsive particles configured in a monolayer arrangement, but may not be limited thereto. The humidity-unresponsive particles are crystalline particles and substantially nonporous. For example, the humidity-unresponsive particles do not have pores having a size of about 50 nm or less therein.

In an embodiment of the present disclosure, the humidity-unresponsive particles may include oxides and may include at least oxides selected from $SiO_2$, $TiO_2$, $BaTiO_3$, $ZnO$, $Ta_2O_3$, $Nb_2O_3$, $CaO$, $Li_2O$, $SnO_2$, $Sb_2O_3$, $Sb_2O_4$, $As_2O_3$, $SrTiO_3$, $PbTiO_3$, and $CaTiO_3$, but may not be limited thereto. For example, the crystalline particles may include $TiO_2$ particles having a crystal structure such as an anatase- or rutile-type, but may not be limited thereto.

In an embodiment of the present disclosure, an average diameter of the humidity-unresponsive particles may be from about 0.05 µm to about 10 µm, but may not be limited thereto. For example, the average diameter of the humidity-unresponsive particles may be from about 0.05 µm to about 10 µm, from about 0.05 µm to about 9 µm, from about 0.05 µm to about 8 µm, from about 0.05 µm to about 7 µm, from about 0.05 µm to about 6 µm, from about 0.05 µm to about 5 µm, from about 0.05 µm to about 4 µm, from about 0.05 µm to about 3 µm, from about 0.05 µm to about 2 µm, from about 0.05 µm to about 1 µm, from about 0.05 µm to about 0.5 µm, from about 0.05 µm to about 0.2 µm, from about 0.05 µm to about 0.1 µm, from about 0.1 µm to about 10 µm, from about 0.1 µm to about 9 µm, from about 0.1 µm to about 8 µm, from about 0.1 µm to about 7 µm, from about 0.1 µm to about 6 µm, from about 0.1 µm to about 5 µm, from about 0.1 µm to about 4 µm, from about 0.1 µm to about 3 µm, from about 0.1 µm to about 2 µm, from about 0.1 µm to about 1 µm, from about 0.1 µm to about 0.5 µm, from about 0.1 µm to about 0.2 µm, from about 0.2 µm to about 10 µm, from about 0.2 µm to about 9 µm, from about 0.2 µm to about 8 µm, from about 0.2 µm to about 7 µm, from about 0.2 µm to about 6 µm, from about 0.2 µm to about 5 µm, from about 0.2 µm to about 4 µm, from about 0.2 µm to about 3 µm, from about 0.2 µm to about 2 µm, from about 0.2 µm to about 1 µm, from about 0.2 µm to about 0.5 µm, from about 0.5 µm to about 10 µm, from about 0.5 µm to about 9 µm, from about 0.5 µm to about 8 µm, from about 0.5 µm to about 7 µm, from about 0.5 µm to about 6 µm, from about 0.5 µm to about 5 µm, from about 0.5 µm to about 4 µm, from about 0.5 µm to about 3 µm, from about 0.5 µm to about 2 µm, from about 0.5 µm to about 1 µm, from about 1 µm to about 10 µm, from about 1 µm to about 9 µm, from about 1 µm to about 8 µm, from about 1 µm to about 7 µm, from about 1 µm to about 6 µm, from about 1 µm to about 5 µm, from about 1 µm to about 4 µm, from about 1 µm to about 3 µm, from about 1 µm to about 2 µm, from about 2 µm to about 10 µm, from about 2 µm to about 9 µm, from about 2 µm to about 8 µm, from about 2 µm to about 7 µm, from about 2 µm to about 6 µm, from about 2 µm to about 5 µm, from about 2 µm to about 4 µm, from about 2 µm to about 3 µm, from about 3 µm to about 10 µm, from about 3 µm to about 9 µm, from about 3 µm to about 8 µm, from about 3 µm to about 7 µm, from about 3 µm to about 6 µm, from about 3 µm to about 5 µm, from about 3 µm to about 4 µm, from about 4 µm to about 10 µm, from about 4 µm to about 9 µm, from about 4 µm to about 8 µm, from about 4 µm to about 7 µm, from about 4 µm to about 6 µm, from about 4 µm to about 5 µm, from abut 5 µm to about 10 µm, from about 5 µm to about 9 µm, from about 5 µm to about 8 µm, from about 5 µm to about 7 µm, from about 5 µm to about 6 µm, from about 6 µm to about 10 µm, from about 6 µm to about 9 µm, from about 6 µm to about 8 µm, from about 6 µm to about 7 µm, from about 7 µm to about 10 µm, from about 7 µm to about 9 µm, from about 7 µm to about 8 µm, from about 8 µm to about 10 µm, from about 8 µm to about 9 µm, or from about 9 µm to about 10 µm, but may not be limited thereto.

Further, in an embodiment of the present disclosure, the humidity-unresponsive particles may have an average diameter of from about 0.2 µm to about 2 µm, but may not be limited thereto. For example, the humidity-unresponsive particles may have an average diameter of from about 0.2 µm to about 2 µm, from about 0.2 µm to about 1.8 µm, from about 0.2 µm to about 1.6 µm, from about 0.2 µm to about 1.4 µm, from about 0.2 µm to about 1.2 µm, from about 0.2 µm to about 1 µm, from about 0.2 µm to about 0.8 µm, from about 0.2 µm to about 0.6 µm, from about 0.2 µm to about 0.4 µm, from about 0.4 µm to about 2 µm, from about 0.6 µm to about 2 µm, from about 0.8 µm to about 2 µm, from about 1 µm to about 2 µm, from about 1.2 µm to about 2 µm, from about 1.4 µm to about 2 µm, from about 1.6 µm to about 2 µm, or from about 1.8 µm to about 2 µm, but may not be limited thereto.

In another embodiment of the present disclosure, the colorimetric humidity sensor may further include a second colorimetric member including second humidity-responsive particles configured in a disordered monolayer arrangement, and an average diameter of the second humidity-responsive particles is different from that of the humidity-responsive particles, but may not be limited thereto. For example, the second colorimetric member including the second humidity-responsive particles configured in a disordered monolayer arrangement may be arranged on the colorimetric member, on the monolayer arrangement of the humidity-unresponsive particles in the colorimetric member, or between the colorimetric member and the monolayer arrangement of the humidity-unresponsive particles. For example, the second colorimetric member including the second humidity-responsive particles configured in a disordered monolayer arrangement is formed to have slight or less color change according to humidity than the colorimetric member. As a non-limiting example, if a display icon is configured using the humidity-responsive particles and the background except the display icon is configured using the humidity-unresponsive particles and/or the second humidity-responsive particles, only the humidity-responsive particles may change in color according to humidity and the color of the particles forming the background does not change or change slightly, and thus, only the color of the display icon can be changed remarkably as the humidity is changed.

In an embodiment of the present disclosure, an average diameter of the second humidity-responsive particles is different from that of the humidity-responsive particles and may be from about 0.05 µm to about 10 µm, but may not be limited thereto. For example, the average diameter of the second humidity-responsive particles may be from about 0.05 µm to about 10 µm, from about 0.05 µm to about 9 µm, from about 0.05 µm to about 8 µm, from about 0.05 µm to about 7 µm, from about 0.05 µm to about 6 µm, from about 0.05 µm to about 5 µm, from about 0.05 µm to about 4 µm, from about 0.05 µm to about 3 µm, from about 0.05 µm to about 2 µm, from about 0.05 µm to about 1 µm, from about 0.05 µm to about 0.5 µm, from about 0.05 µm to about 0.2 µm, from about 0.05 µm to about 0.1 µm, from about 0.1 µm to about 10 µm, from about 0.1 µm to about 9 µm, from about 0.1 µm to about 8 µm, from about 0.1 µm to about 7 µm, from about 0.1 µm to about 6 µm, from about 0.1 µm to about 5 µm, from about 0.1 µm to about 4 µm, from about 0.1 µm to about 3 µm, from about 0.1 µm to about 2 µm, from about 0.1 µm to about 1 µm, from about 0.1 µm to about 0.5 µm, from about 0.1 µm to about 0.2 µm, from about 0.2 µm to about 10 µm, from about 0.2 µm to about 9 µm, from about 0.2 µm to about 8 µm, from about 0.2 µm to about 7 µm, from about 0.2 µm to about 6 µm, from about 0.2 µm to about 5 µm, from about 0.2 µm to about 4 µm, from about 0.2 µm to about 3 µm, from about 0.2 µm to about 2 µm, from about 0.2 µm to about 1 µm, from about 0.2 µm to about 0.5 µm, from about 0.5 µm to about 10 µm, from about 0.5 µm to about 9 µm, from about 0.5 µm to about 8 µm, from about 0.5 µm to about 7 µm, from about 0.5 µm to about 6 µm, from about 0.5 µm to about 5 µm, from about 0.5 µm to about 4 µm, from about 0.5 µm to about 3 µm, from about 0.5 µm to about 2 µm, from about 0.5 µm to about 1 µm, from about 1 µm to about 10 µm, from about 1 µm to about 9 µm, from about 1 µm to about 8 µm, from about 1 µm to about 7 µm, from about 1 µm to about 6 µm, from about 1 µm to about 5 µm, from about 1 µm to about 4 µm, from about 1 µm to about 3 µm, from about 1 µm to about 2 µm, from about 2 µm to about 10 µm, from about 2 µm to about 9 µm, from about 2 µm to about 8 µm, from about 2 µm to about 7 µm, from about 2 µm to about 6 µm, from about 2 µm to about 5 µm, from about 2 µm to about 4 µm, from about 2 µm to about 3 µm, from about 3 µm to about 10 µm, from about 3 µm to about 9 µm, from about 3 µm to about 8 µm, from about 3 µm to about 7 µm, from about 3 µm to about 6 µm, from about 3 µm to about 5 µm, from about 3 µm to about 4 µm, from about 4 µm to about 10 µm, from about 4 µm to about 9 µm, from about 4 µm to about 8 µm, from about 4 µm to about 7 µm, from about 4 µm to about 6 µm, from about 4 µm to about 5 µm, from about 5 µm to about 10 µm, from about 5 µm to about 9 µm, from about 5 µm to about 8 µm, from about 5 µm to about 7 µm, from about 5 µm to about 6 µm, from about 6 µm to about 10 µm, from about 6 µm to about 9 µm, from about 6 µm to about 8 µm, from about 6 µm to about 7 µm, from about 7 µm to about 10 µm, from about 7 µm to about 9 µm, from about 7 µm to about 8 µm, from about 8 µm to about 10 µm, from about 8 µm to about 9 µm, or from about 9 µm to about 10 µm, but may not be limited thereto.

Further, in an embodiment of the present disclosure, the average diameter of the second humidity-responsive particles may be, e.g., from about 0.2 µm to about 2 µm, from about 0.2 µm to about 1.8 µm, from about 0.2 µm to about 1.6 µm, from about 0.2 µm to about 1.4 µm, from about 0.2 µm to about 1.2 µm, from about 0.2 µm to about 1 µm, from about 0.2 µm to about 0.8 µm, from about 0.2 µm to about 0.6 µm, from about 0.2 µm to about 0.4 µm, from about 0.4 µm to about 2 µm, from about 0.6 µm to about 2 µm, from about 0.8 µm to about 2 µm, from about 1 µm to about 2 µm, from about 1.2 µm to about 2 µm, from about 1.4 µm to about 2 µm, from about 1.6 µm to about 2 µm, or from about 1.8 µm to about 2 µm, but may not be limited thereto.

In an embodiment of the present disclosure, moisture may be adsorbed in the pores of the humidity-responsive particles. Also, in an embodiment of the present disclosure, the colorimetric humidity sensor may indicate a change in saturation of the color according to an angle of light irradiation.

In an embodiment of the present disclosure, the humidity-responsive particles may express structural colors responsive to the humidity in the disordered arrangement. The microspheres according to an embodiment of the present disclosure have a high porosity and thus can absorb moisture into the pores. Thus, when moisture is absorbed, the humidity-responsive particles significantly change in effective permittivity.

In an embodiment of the present disclosure, the color change of the colorimetric humidity sensor upon light irradiation can be measured by a typical optical measuring instrument, but the present disclosure may not be limited thereto. In an embodiment of the present disclosure, the color change of the colorimetric humidity sensor upon light irradiation may be measured by an optical measuring instrument using at least one selected from a photodiode, a charge coupled device (CCD), and a complementary metal oxide semiconductor (CMOS), but may not be limited thereto.

A second aspect of the present disclosure provides a method of preparing a colorimetric humidity sensor, including: synthesizing amorphous microspheres by a non-aqueous solvothermal method to prepare humidity-responsive particles; and coating the humidity-responsive particles in a monolayer on a substrate to form a colorimetric member.

All the descriptions of the colorimetric humidity sensor in accordance with the first aspect of the present disclosure can be applied to the method of preparing a colorimetric humidity sensor in accordance with the second aspect of the present disclosure. Detailed descriptions of parts of the second aspect, which overlap with those of the first aspect, are omitted hereinafter, but the descriptions of the first aspect of the present disclosure may be identically applied to the second aspect of the present disclosure, even though they are omitted hereinafter.

In an embodiment of the present disclosure, the humidity-responsive particles may have amorphous, porous, and polydispersed nature.

In an embodiment of the present disclosure, the colorimetric member may include the humidity-responsive particles configured in a disordered monolayer arrangement.

In an embodiment of the present disclosure, the amorphous microspheres may be synthesized to have different average diameters, respectively, but may not be limited thereto.

In an embodiment of the present disclosure, the humidity-responsive particles may include at least one oxides, but may not be limited thereto. In an embodiment of the present disclosure, the humidity-responsive particles may include at least one oxides selected from $SiO_2$, $TiO_2$, $BaTiO_3$, $ZnO$, $Ta_2O_3$, $Nb_2O_3$, $CaO$, $Li_2O$, $SnO_2$, $Sb_2O_3$, $Sb_2O_4$, $As_2O_3$, $SrTiO_3$, $PbTiO_3$, and $CaTiO_3$, but may not be limited thereto.

In an embodiment of the present disclosure, the colorimetric member may indicate a different color according to an average diameter of the humidity-responsive particles. According to an embodiment of the present disclosure, the average diameter of the humidity-responsive particles may be from about 0.05 µm to 10 µm, but may not be limited thereto. For example, the average diameter of the humidity-responsive particles may be from about 0.05 µm to about 10 µm, from about 0.05 µm to about 9 µm, from about 0.05 µm to about 8 µm, from about 0.05 µm to about 7 µm, from about 0.05 µm to about 6 µm, from about 0.05 µm to about 5 µm, from about 0.05 µm to about 4 µm, from about 0.05 µm to about 3 µm, from about 0.05 µm to about 2 µm, from about 0.05 µm to about 1 µm, from about 0.05 µm to about 0.5 µm, from about 0.05 µm to about 0.2 µm, from about 0.05 µm to about 0.1 µm, from about 0.1 µm to about 10 µm, from about 0.1 µm to about 9 µm, from about 0.1 µm to about 8 µm, from about 0.1 µm to about 7 µm, from about 0.1 µm to about 6 µm, from about 0.1 µm to about 5 µm, from about 0.1 µm to about 4 µm, from about 0.1 µm to about 3 µm, from about 0.1 µm to about 2 µm, from about 0.1 µm to about 1 µm, from about 0.1 µm to about 0.5 µm, from about 0.1 µm to about 0.2 µm, from about 0.2 µm to about 10 µm, from about 0.2 µm to about 9 µm, from about 0.2 µm to about 8 µm, from about 0.2 µm to about 7 µm, from about 0.2 µm to about 6 µm, from about 0.2 µm to about 5 µm, from about 0.2 µm to about 4 µm, from about 0.2 µm to about 3 µm, from about 0.2 µm to about 2 µm, from about 0.2 µm to about 1 µm, from about 0.2 µm to about 0.5 µm, from about 0.5 µm to about 10 µm, from about 0.5 µm to about 9 µm, from about 0.5 µm to about 8 µm, from about 0.5 µm to about 7 µm, from about 0.5 µm to about 6 µm, from about 0.5 µm to about 5 µm, from about 0.5 µm to about 4 µm, from about 0.5 µm to about 3 µm, from about 0.5 µm to about 2 µm, from about 0.5 µm to about 1 µm, from about 1 µm to about 10 µm, from about 1 µm to about 9 µm, from about 1 µm to about 8 µm, from about 1 µm to about 7 µm, from about 1 µm to about 6 µm, from about 1 µm to about 5 µm, from about 1 µm to about 4 µm, from about 1 µm to about 3 µm, from about 1 µm to about 2 µm, from about 2 µm to about 10 µm, from about 2 µm to about 9 µm, from about 2 µm to about 8 µm, from about 2 µm to about 7 µm, from about 2 µm to about 6 µm, from about 2 µm to about 5 µm, from about 2 µm to about 4 µm, from about 2 µm to about 3 µm, from about 3 µm to about 10 µm, from about 3 µm to about 9 µm, from about 3 µm to about 8 µm, from about 3 µm to about 7 µm, from about 3 µm to about 6 µm, from about 3 µm to about 5 µm, from about 3 µm to about 4 µm, from about 4 µm to about 10 µm, from about 4 µm to about 9 µm, from about 4 µm to about 8 µm, from about 4 µm to about 7 µm, from about 4 µm to about 6 µm, from about 4 µm to about 5 µm, from about 5 µm to about 10 µm, from about 5 µm to about 9 µm, from about 5 µm to about 8 µm, from about 5 µm to about 7 µm, from about 5 µm to about 6 µm, from about 6 µm to about 10 µm, from about 6 µm to about 9 µm, from about 6 µm to about 8 µm, from about 6 µm to about 7 µm, from about 7 µm to about 10 µm, from about 7 µm to about 9 µm, from about 7 µm to about 8 µm, from about 8 µm to about 10 µm, from about 8 µm to about 9 µm, or from about 9 µm to about 10 µm, but may not be limited thereto.

Further, in an embodiment of the present disclosure, the humidity-responsive particles may have a size distribution of from about 0.2 µm to about 2 µm, but may not be limited thereto. For example, the humidity-responsive particles may have a size distribution of from about 0.2 µm to about 2 µm, from about 0.2 µm to about 1.8 µm, from about 0.2 µm to about 1.6 µm, from about 0.2 µm to about 1.4 µm, from about 0.2 µm to about 1.2 µm, from about 0.2 µm to about 1 µm, from about 0.2 µm to about 0.8 µm, from about 0.2 µm to about 0.6 µm, from about 0.2 µm to about 0.4 µm, from about 0.4 µm to about 2 µm, from about 0.6 µm to about 2 µm, from about 0.8 µm to about 2 µm, from about 1 µm to about 2 µm, from about 1.2 µm to about 2 µm, from about 1.4 µm to about 2 µm, from about 1.6 µm to about 2 µm, or from about 1.8 µm to about 2 µm, but may not be limited thereto.

In an embodiment of the present disclosure, an average size of pores in the microspheres may be from about 1 nm to about 60 nm, but may not be limited thereto. For example, the average size of the pores in the microspheres may be from about 1 nm to about 60 nm, from about 1 nm to about 50 nm, from about 1 nm to about 40 nm, from about 1 nm to about 30 nm, from about 1 nm to about 20 nm, from about 1 nm to about 10 nm, from about 1 nm to about 5 nm, from about 5 nm to about 60 nm, from about 10 nm to about 60 nm, from about 20 nm to about 60 nm, from about 30 nm to about 60 nm, from about 40 nm to about 60 nm, or from about 50 nm to about 60 nm, but may not be limited thereto.

In an embodiment of the present disclosure, the humidity-responsive particles have pores, and a porosity of the humidity-responsive particles may be from about 20% to about 70%, but may not be limited thereto. For example, the porosity of the humidity-responsive particles may be from about 20% to about 70%, from about 20% to about 60%, from about 20% to about 50%, from about 20% to about 40%, from about 20% to about 30%, from about 30% to about 70%, from about 40% to about 70%, from about 50% to about 70%, or from about 60% to about 70%, but may not be limited thereto.

In an embodiment of the present disclosure, the forming of the colorimetric member may be performed through spin-coating, but may not be limited thereto. Further, in an embodiment of the present disclosure, the colorimetric member may include the amorphous microspheres configured in a disordered monolayer arrangement.

In an embodiment of the present disclosure, second humidity-responsive particles may be prepared by synthesizing the amorphous microspheres having different average diameters, respectively, but may not be limited thereto. When the humidity-responsive particles are prepared, an average diameter of the amorphous microspheres can be controlled.

In an embodiment of the present disclosure, the method of preparing a colorimetric humidity sensor may further include coating humidity-unresponsive particles or the second humidity-responsive particles in a monolayer on the substrate, but may not be limited thereto. The monolayer of the humidity-unresponsive particles or the second humidity-responsive particles may be formed in a region of the substrate where the colorimetric member is not formed.

In an embodiment of the present disclosure, in the colorimetric member, the amorphous microspheres, the humidity-responsive particles, the humidity-unresponsive particles or the second humidity-responsive particles may be configured in a disordered monolayer arrangement, but may not be limited thereto.

In an embodiment of the present disclosure, the humidity-unresponsive particles are crystalline particles and substantially nonporous. For example, the humidity-unresponsive particles do not have pores having a size of about 50 nm or less therein.

In an embodiment of the present disclosure, the humidity-unresponsive particles may include oxides and may include at least one oxides selected from $SiO_2$, $TiO_2$, $BaTiO_3$, $ZnO$, $Ta_2O_3$, $Nb_2O_3$, $CaO$, $Li_2O$, $SnO_2$, $Sb_2O_3$, $Sb_2O_4$, $As_2O_3$, $SrTiO_3$, $PbTiO_3$, and $CaTiO_3$, but may not be limited thereto. For example, the crystalline particles may include $TiO_2$ particles having a crystal structure such as an anatase- or rutile-type, but may not be limited thereto.

In an embodiment of the present disclosure, humidity-responsive structural colors from a random arrangement of amorphous microspheres are demonstrated. Through a comprehensive suite of characterization methods and optical analysis using effective medium theory, it is shown that a large fraction of the amorphous titania microsphere is microporous, permitting significant changes to the effective permittivity upon water uptake. Individually the microspheres are indistinguishable by scattered light in dry and humid environments, but the microspheres display color contrast in the both environments as the superposition of the individual scattering spectra, determined by the polydispersed size distribution and effective permittivity, exposes smoothly varying spectral features unique to the humid environment. The correlation between pore volume filling by water and spectral change enables the water uptake amount by the microspheres to be attained optically using a fraction of material and time required by conventional gravimetric analysis. Lack of spatial order for color generation also facilitates the fabrication of a simple binary humidity-responsive display, optimized in speed and signal at only a monolayer coverage of particles. Such results suggest intriguing possibilities for realizing cheap, simple and efficient colorimetric humidity sensors using structural colors from disordered systems.

In an embodiment of the present disclosure, reflectivity changes of the material due to moisture-induced volume swelling alters the material color, demonstrating the involvement of optical, physiochemical and mechanical processes. Although the combination of these mechanisms provides large colorimetric ranges, the swelling process limits the response time to a range of hundreds of milliseconds to a few minutes. A colorimetric system that does not involve volume swelling but only optical and diffusive mechanisms, in principle, could offer faster response rates.

In an embodiment of the present disclosure, demonstrated is a fast, humidity-sensitive colorimetric system using disordered structural colors in the form of randomly arranged amorphous, polydispersed titania microspheres. Although the microspheres individually exhibit a noisy scattering spectrum in the visible range, their ensemble collectively displays a smoothly varying scattering spectrum that translates to an optimally saturated color. Because scattering from the microspheres is incoherent, the total scattering cross section in the far field can be expressed as the sum of individual scattering cross sections generated by every particle. This washes out the spectral noise and exposes smoothly varying features in the total scattering spectrum. The microspheres are characterized by a large porosity that, when occupied by water vapor, changes the effective refractive index of the system. In the present disclosure, the strong correlation between pore volume filling and spectral change is exploited to extract the water uptake amount using only a fraction of sample and time required by conventional gravimetric analysis. The particles of the present disclosure show moderately reversible characteristics and rapid responses. Finally, the present disclosure describes, through spin-coating, a binary humidity display optimized in color saturation with only a monolayer coverage of humidity responsive and unresponsive microspheres.

Hereinafter, the present disclosure will be explained in more detail with reference to Examples. However, the following Examples are illustrative only for better understanding of the present disclosure but do not limit the present disclosure.

MODE FOR CARRYING OUT THE INVENTION

Hereinafter, the present disclosure will be described in more detail with reference to Examples, but the present disclosure may not be limited thereto.

EXAMPLES

Microsphere Synthesis

Submicron sized titania microspheres were synthesized via a non-aqueous solvothermal process using a standard procedure as reported previously, which follows the Ostwald ripening mechanism in providing size-controllable and smooth microspheres. Typically, 5 ml acetylacetone was dissolved in a 20 ml solvent mixture of Isopropyl alcohol and acetone. Then, tetrabutyl orthotitanate (TBOT) (from 4 mmol to 6 mmol) was dropped rapidly into the solution, followed by the final addition of ethylene glycol. The solution was mixed under vigorous stirring for 20 min at ambient temperature. The homogenous transparent yellowish mixture was transferred to a 50 ml Teflon-lined stainless-steel autoclave, and then placed inside a muffle furnace for thermal treatment at 200° C. for 3 hr. The yellowish precipitate was then collected by centrifugation, washed with acetone and ethanol for several times and dried at 60° C. For use as Comparative Example, TiO$_2$ anatase microspheres were prepared by further annealing the amorphous titania microspheres at 500° C. for 3 hr.

Characterization of the Microspheres

The morphology of the microspheres was analyzed by a Field Emission Scanning Electron Microscope (FESEM, JEOL, JSM-6700F) at an accelerating voltage of 10 kV. The powder X-Ray diffraction (XRD) patterns were collected on a Rigaku D/Max-2000/PC diffractometer with Cu Kα radiation (λ=1.5418 Å) at 25° C. with a tube accelerating voltage and applied current of 40 kV and 30 mA, respectively. The porosity analysis was monitored with a Micromeritics volumetric adsorption analyzer (BELSORP mini II) at 77 K. Before the measurements, the samples were pre-treated under vacuum at 125° C. for 5 hr. The functional groups of the samples were investigated using a Varian FTS-800 Scimitar series infrared spectrometer in a potassium bromide (KBr) matrix over an energy range of from 4,000 cm$^{-1}$ to 400 cm$^{-1}$.

Extinction Measurements at Different Relative Humidity (RH) environments

Saturated-salt solutions, composed of salt slurries made with distilled water, were used for controlling the RH. The RH values were calibrated through a hygrometer. The measured RH values of the silica gel and corresponding saturated salts solutions were as follows: silica gel (3.3%), KOH (8.0%), CH$_3$COOK (22.3%), MgCl$_2$ (34.9%), K$_2$CO$_3$ (45.8%), Mg(NO$_3$)$_2$ (53.5%), NaCl (75.7%), and K$_2$SO$_4$ (97.1%). Extinction measurements were carried out with a UV-Vis spectrophotometer (UV-vis, SHIMADZU, UV-2450) on microsphere samples that were dispersed onto a glass slide and enclosed in a sealed cuvette cell containing the saturated-salt solution.

Gravimetric Analysis

Dynamic vapor sorption (surface measurement systems, DVS advantage) was performed to measure the amount of water uptake as a function of RH. The RH was incrementally increased at room temperature from 0% to 100% at an interval of 5% by changing the ratio of the gas mixture of dry and saturated gases. Amorphous titania microspheres (set D, 13.8 mg) were used for the analysis. The particles were preheated at 150° C. for 3 hr to fully remove adsorbed water molecules. The sample mass was measured every 1 min throughout the RH scan.

Calculation of Differential Scattering Cross Section

The angle dependent scattering was analytically calculated using Mie theory. The explicit expressions for the scattering coefficients a$_n$ and b$_n$ for a single particle are given by:

$$a_n = \frac{\varepsilon j_n(\sqrt{\varepsilon}ka)[kaj_n(ka)]' - j_n(ka)[\sqrt{\varepsilon}kaj_n(\sqrt{\varepsilon}ka)]'}{\varepsilon j_n(\sqrt{\varepsilon}ka)[kah_n^{(1)}(ka)]' - h_n^{(1)}(ka)[\sqrt{\varepsilon}kaj_n(\sqrt{\varepsilon}ka)]'} \quad (1)$$

$$b_n = \frac{j_n(\sqrt{\varepsilon}ka)[kaj_n(ka)]' - j_n(ka)[\sqrt{\varepsilon}kaj_n(\sqrt{\varepsilon}ka)]'}{j_n(\sqrt{\varepsilon}ka)[kah_n^{(1)}(ka)]' - h_n^{(1)}(ka)[\sqrt{\varepsilon}kaj_n(\sqrt{\varepsilon}ka)]'} \quad (2)$$

Herein, ε, k, and α represent the effective permittivity, the wave vector, and the particle radius, respectively, of the microsphere. Also, j$_n$ and h$_n$ represent the spherical Bessel and Hankel function, respectively.

Further, S$_{11}$ refers to the angular distribution of scattered light when illuminated by unpolarized light.

$$S_{11} = \frac{1}{2}\left(\left|\sum_n \frac{2n+1}{n(n+1)}\left(a_n \cdot \frac{d^2P_n}{d\theta^2} + b_n \cdot \frac{1}{\sin\theta}\frac{dP_n}{d\theta}\right)\right|^2 + \left|\sum_n \frac{2n+1}{n(n+1)}\left(a_n \cdot \frac{1}{\sin\theta}\frac{dP_n}{d\theta} + b_n \cdot \frac{d^2P_n}{d\theta^2}\right)\right|^2\right) \quad (3)$$

Herein, P$_n$ is the Legendre polynomial.

From Equation (3), the differential scattering cross section from unpolarized incident light can be expressed as:

$$\frac{dC_{sca,tot}}{d\Omega} = \frac{1}{k^2}\sum_i S_{11,i} \quad (4)$$

Herein, the sum is over all particles.

Fabrication of Humidity-Responsive Display

Binary displays were created by using particles responsive and unresponsive to humidity for the icon and background, respectively. The cactus display was fabricated using amorphous titania particles with an average diameter of 0.55 μm for the background and 1.26 μm for the icon. The rainy cloud display was fabricated using anatase particles with an average diameter of 0.45 μm for the background and amorphous titania particles with an average diameter of 1.45 μm for the icon. The particles were dispersed in ethanol at a concentration of 10 mg/ml, and sonicated for over 30 min. For the substrate, a glass slide (2.5×2.5 cm$^2$) was cleaned by rinsing for 30 min in acetone followed by 30 min in ethanol. A mask with the icon image was attached to one side of the glass slide, and an inverse mask was attached to the other side. The humidity-responsive particles were spin-coated onto the masked side at 1500 rpm for 30 seconds, and repeated 5 times. Thereafter, the unresponsive particles were spin-coated onto the other side using the same conditions. The both masks were then removed from the glass slide.

Measurements of Response Time

While a difference in illuminating power of scattered light at a fixed wavelength was monitored, the particles were injected into a large amount of humid N$_2$ at variable frequencies (from 3 Hz to 40 Hz) to carry out time-resolved humidity response measurements of the particles. The humid flow (90% RH) was generated using a bubbler containing distilled water, and herein, the N2 gas was injected at about 21 L/min. The measurements were carried out at 20% RH dry conditions. The output flow from the bubbler passed through an optical chopper (Stanford Research Systems, SR540) and targeted to the sample surface. The sample was irradiated with light output from an optical fiber connected to a supercontinuum laser (NKT Photonics) to monitor changes in scattering response. The laser wavelength was adjusted by an acousto-optic tunable filter (AOTF) to a value at which the maximum response to changes in humidity is generated. The scattered signal was collected by a Si photodiode (Thorlabs, PDA10A2) with an ultrafast rise time (2.3 ns), and read by an oscilloscope (Tektronix, TBS2000).

<Results and Discussion>

Figure 19:
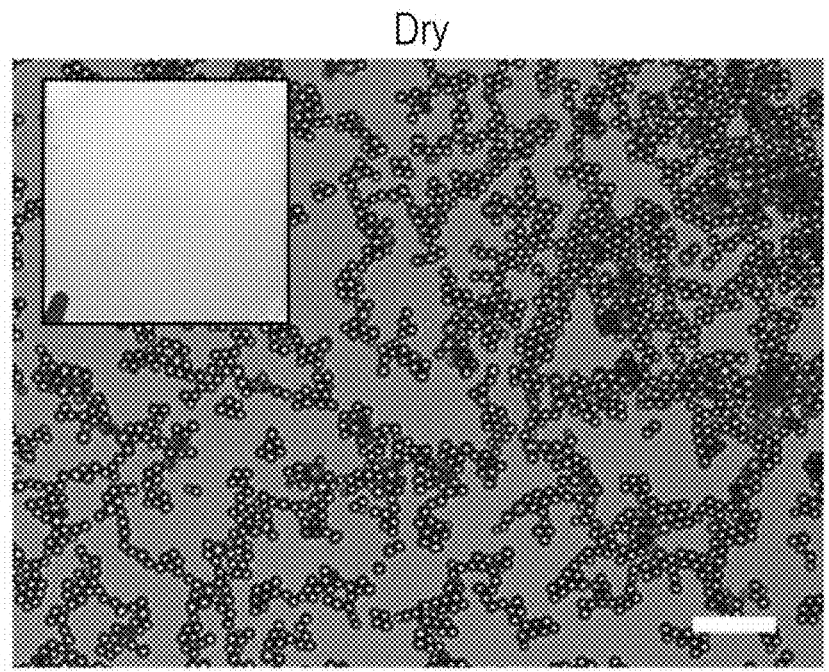
FIG. 19 shows a bright field optical image and a photograph (inset) of the amorphous D set in dry conditions obtained using a 100×0.9 NA objective lens according to Example of the present disclosure, and scale bar is 20 µm.
Figure 20:
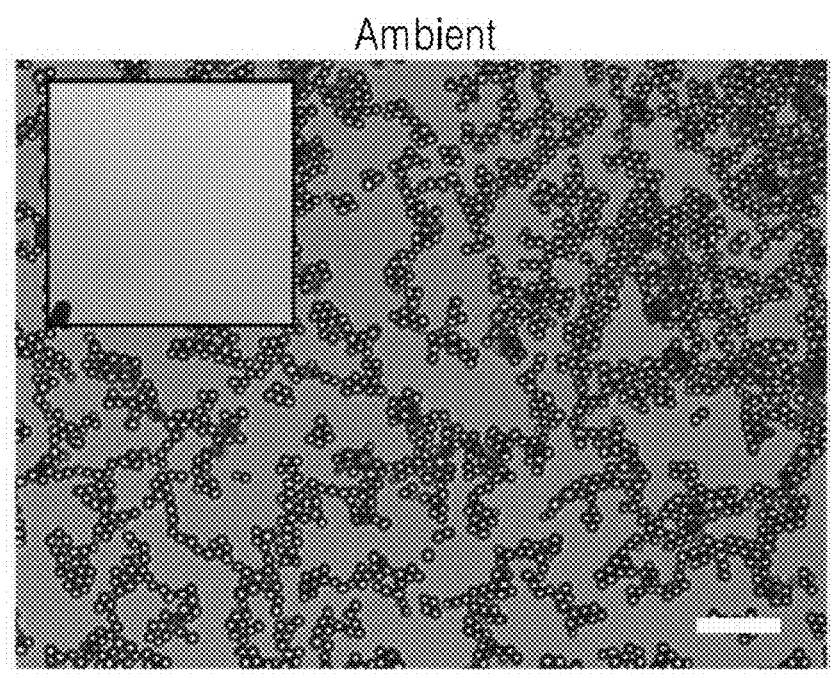
FIG. 20 shows a bright field optical image and a photograph (inset) of the amorphous D set in ambient humidity conditions obtained using a 100×0.9 NA objective lens according to Example of the present disclosure, and scale bar is 20 µm.

Amorphous titania particles with controlled sizes and smooth spherical geometries were fabricated using a hydrothermal method with details described in the methods section. One key difference between this synthesis and that of previous reports is that the particles were not annealed but left in an amorphous state. In the present Example, five different sets labelled in sequence of increasing average diameter from A to E were prepared. SEM images and the measured size distribution from more than about 500 particles (FIG. 1A (i) to FIG. 1E (ii)) confirm the poor spatial order and polydispersed nature of the particles, respectively. To view the scattered colors, the present inventors prepared a monolayer film of sparsely distributed particles on a glass slide, and observed the forward scattered light in the far-field, generated by a white light source (inset of FIG. 1A (i) to FIG. 1E (ii)). The respective colors of the scattered lights were as follows: Amorphous A [Dry condition: tangerine, Ambient condition: orange], Amorphous B [Dry condition: lilac, Ambient condition: sky blue], Amorphous C [Dry condition: green, Ambient condition: lemon], Amorphous D [Dry condition: yellow beige, Ambient condition: orange], and Amorphous E [Dry condition: brown, Ambient condition: beige]. Each particle set generated spatially uniform and distinct colors despite the marginal coverage that changed in dry and ambient environments (i.e., about 50% RH). Interestingly, when resolved using a 0.9 NA objective lens in bright field mode, the individual particles appeared colorless, and displayed no color contrast between dry (beige) and ambient (pink beige) humidity conditions (FIG. 19 and FIG. 20). These results highlight the importance of collective scattering in contrast to individual scattering for generating distinct humidity-responsive colors.

To better understand the humidity-responsivity mechanism, anatase $TiO_2$ particles were prepared as Comparative Example by annealing the amorphous particles at 500° C. for 3 hr. As shown in FIGS. 1F (i) and 1F (ii), the anatase particles also exhibit spatial disorder and polydispersity, but show no color contrast between dry and ambient environments (colors of both cases were purple grey). Since physical differences between the amorphous and anatase particles originate from differences in crystalline phase, it can be assumed that the humidity responsivities depend largely on the microstructure.

Figure 2B:
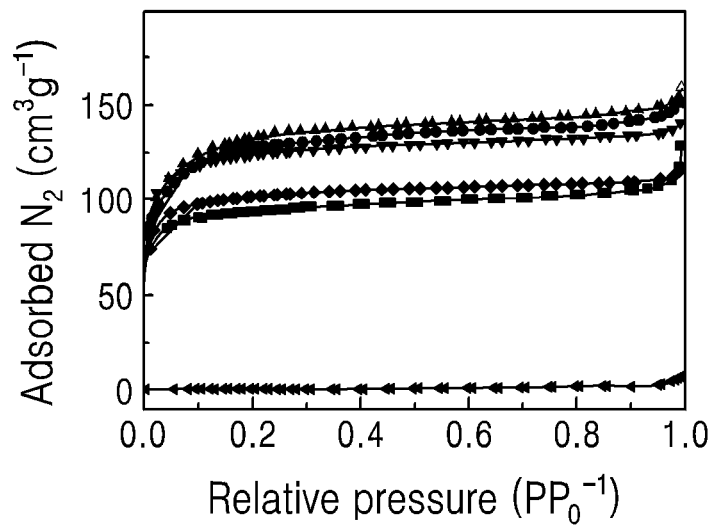
FIG. 2B shows $N_2$ adsorption-desorption isotherms of anatase, and amorphous A, B, C, D, and E sets according to Example of the present disclosure.
Figure 2C:
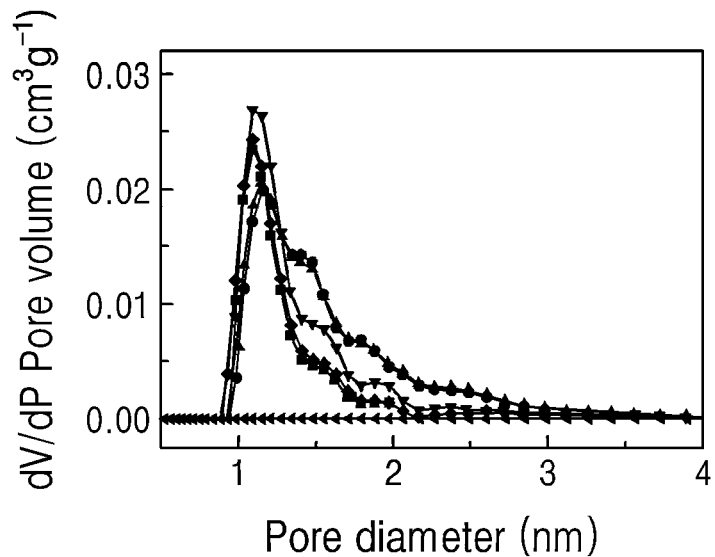
FIG. 2C shows pore size distribution curves of anatase, and amorphous A, B, C, D, and E sets according to Example of the present disclosure.
Figure 3A:
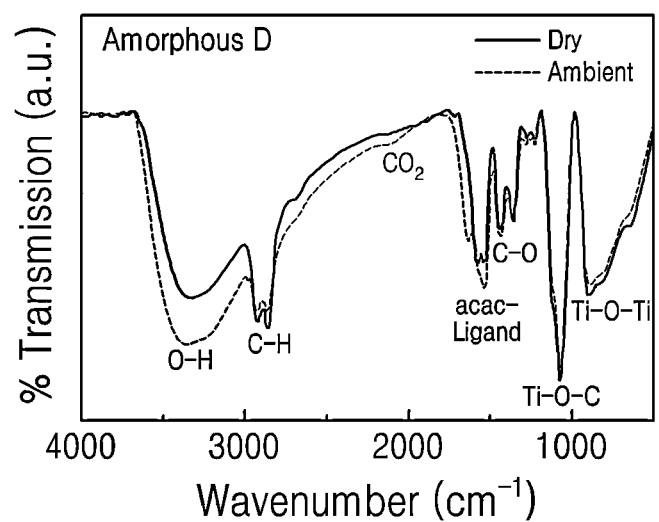
FIG. 3A shows FT-IR spectra of amorphous D particles in dry and ambient environments (about 50% RH) according to Example of the present disclosure.
Figure 3B:
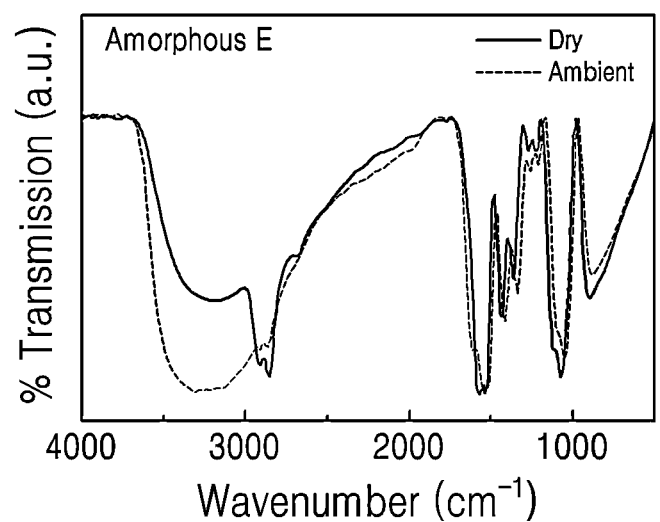
FIG. 3B shows FT-IR spectra of amorphous E particles in dry and ambient environments (about 50% RH) according to Example of the present disclosure.
Figure 3C:
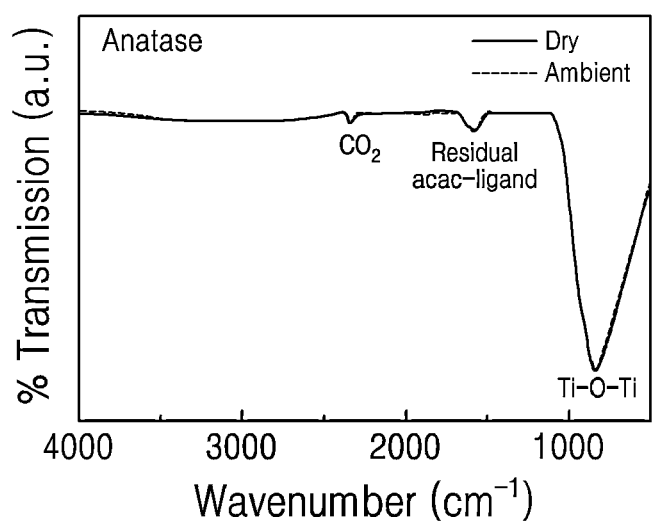
FIG. 3C shows FT-IR spectra of anatase particles in dry and ambient environments (about 50% RH) according to Example of the present disclosure.
Figure 21A:
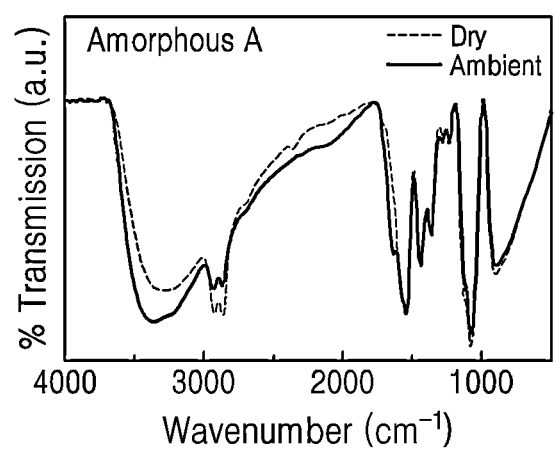
FIG. 21A shows FT-IR spectra of the amorphous A set in dry and ambient humidity conditions according to Example of the present disclosure.
Figure 21B:
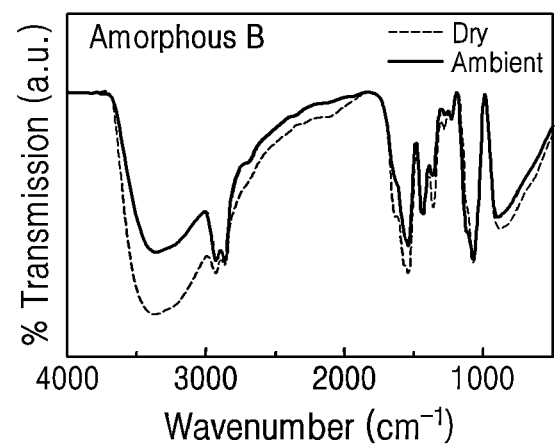
FIG. 21B shows FT-IR spectra of the amorphous B set in dry and ambient humidity conditions according to Example of the present disclosure.
Figure 21C:
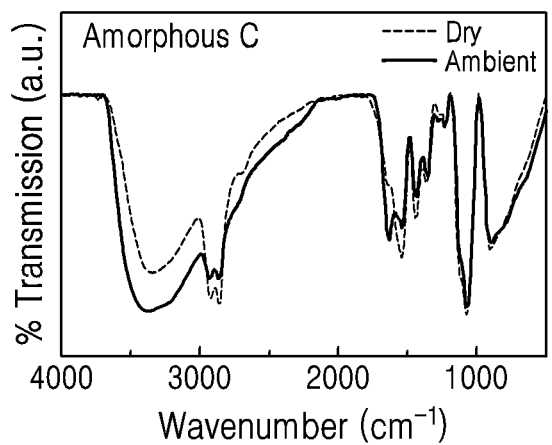
FIG. 21C shows FT-IR spectra of the amorphous C set in dry and ambient humidity conditions according to Example of the present disclosure.

This interpretation was supported by a comprehensive analysis of the crystalline phase, porosity and infrared active modes in both amorphous and anatase particles as shown in FIG. 2A to FIG. 2C. In FIG. 2B and FIG. 2C, each curve is indicated as follows: anatase (◀), amorphous A (■), amorphous B (●), amorphous C (▲), amorphous D (▼), and amorphous E (◆). XRD analysis of the five amorphous particle sets show no crystalline peaks, in contrast to that of the anatase particles (FIG. 2A), confirming the completely amorphous nature of the particles. It is expected that the amorphous particles are formed through the aggregation of smaller nanocrystallites, leaving nanometer-sized pores at the interstices that establish a dense porous network. BET analysis from adsorption isotherms on the five amorphous particle sets indeed confirm that the particles are highly porous characterized by 1 to 2 nm-sized micropores (FIG. 2B and FIG. 2C, Table 1 below) and a small fraction of 2 to 50 nm-sized mesopores (Table 1). In contrast, the anatase particles show negligible adsorption and porosity. These results imply that water molecules can diffuse into the interior of amorphous particles but not of the anatase particles, rendering only the amorphous particles responsive to humidity. To confirm this assumption, FT-IR measurements were performed on each particle set in dry and ambient conditions. In addition to the anatase particles, FIG. 3A to FIG. 3C depict the IR absorption spectra from the D and E amorphous particle sets representing the two extremes in colorimetric range under dry and ambient conditions (see FIG. 21A to FIG. 21C for A, B, and C sets). For the amorphous microspheres, all infrared active modes including the Ti—O/Ti—O—Ti (400-900 $cm^{-1}$), Ti—O—C (1080 $cm^{-1}$), —C—O (1235-1457 $cm^{-1}$), acac ligand (1542, 1575, and 1635 $cm^{-1}$) and C—H (2860-2936 $cm^{-1}$) vibrations showed consistent intensities in dry and ambient environments with the exception of the O—H vibration (3100-3600 $cm^{-1}$). The O—H vibration is present even in dry conditions, but undergoes an enhancement under ambient conditions, verifying the presence of adsorbed water molecules in the pores. In contrast, the anatase particles, characterized by purely Ti—O—Ti vibrations, showed no difference in infrared peak intensities under the same conditions since there are no pores into which water molecules can diffuse. This conclusively shows that the colorimetric humidity responsivity arises from the ability of the amorphous particles to accommodate the accumulation of water molecules in the pores.

Table 1 shows specific surface areas and pore volumes extracted from the BET analysis on $N_2$ adsorption isotherms of the amorphous A, B, C, D, and E sets and anatase particles. The pore volumes were classified into micro (<2 nm) and meso-size (from 2 nm to 50 nm) pores.

TABLE 1

| Microsphere | $S_{BET}$ ($m^2/g$) | Pore volume, V $cm^3/g$) | | |
|---|---|---|---|---|
| | | $V_{Micro}$ | $V_{Meso}$ | $V_{total}$ |
| A | 356 | 0.134 | 0.026 | 0.160 |
| B | 474 | 0.175 | 0.035 | 0.210 |
| C | 491 | 0.180 | 0.022 | 0.202 |
| D | 491 | 0.177 | 0.020 | 0.197 |
| E | 380 | 0.147 | 0.014 | 0.161 |
| Anatase | 2.55 | $0.44 \times 10^{-3}$ | $0.63 \times 10^{-2}$ | $0.674 \times 10^{-2}$ |

Figure 4:
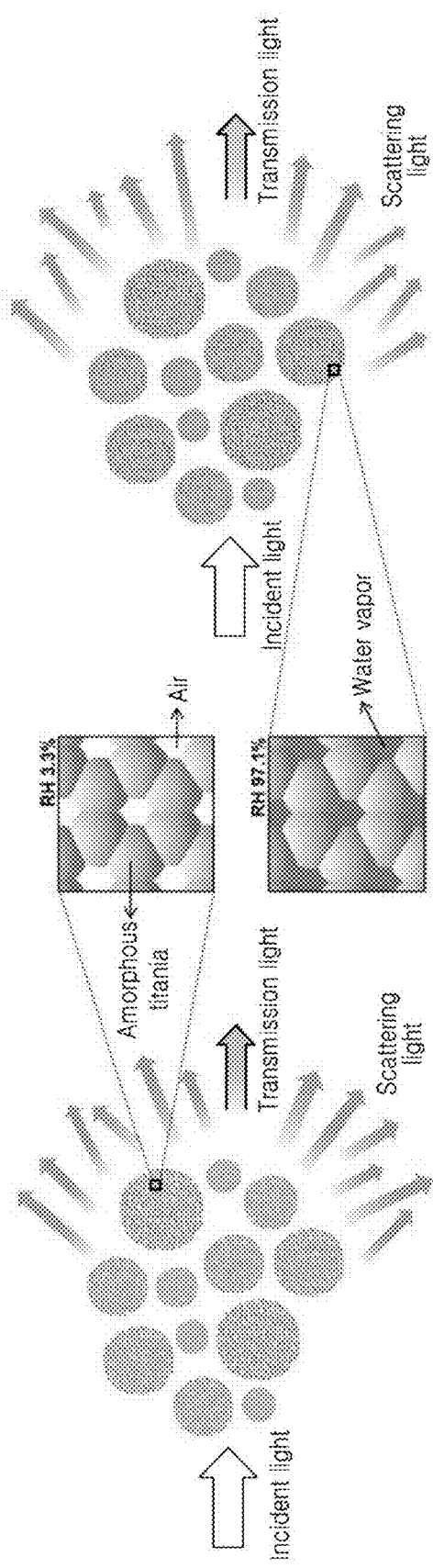
FIG. 4 is a schematic diagram of light scattering from a polydispersed microspheres in dry (left) and saturated humidity (right) environments according to Example of the present disclosure, and the insets show models of pores within amorphous titania filled with air or water vapor.
Figure 5A:
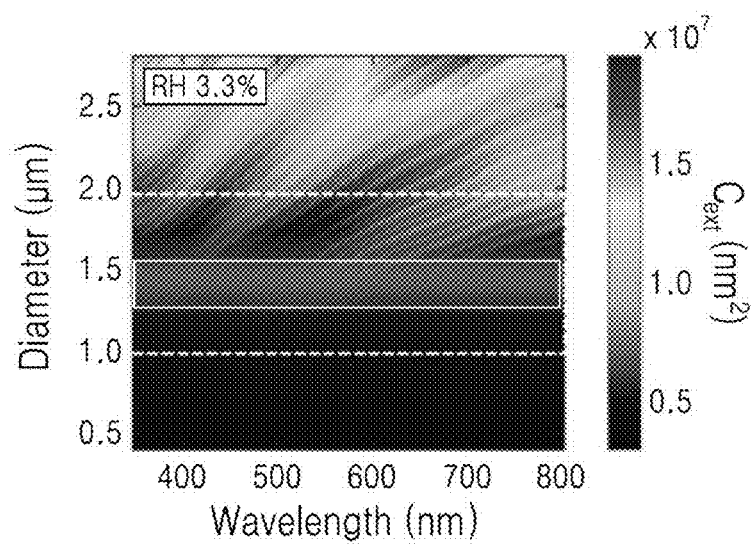
FIG. 5A shows calculated single particle extinction cross sections, as a function of wavelength and diameter superimposed with the size distribution, shown by the square drawn with white solid lines.
Figure 5B:
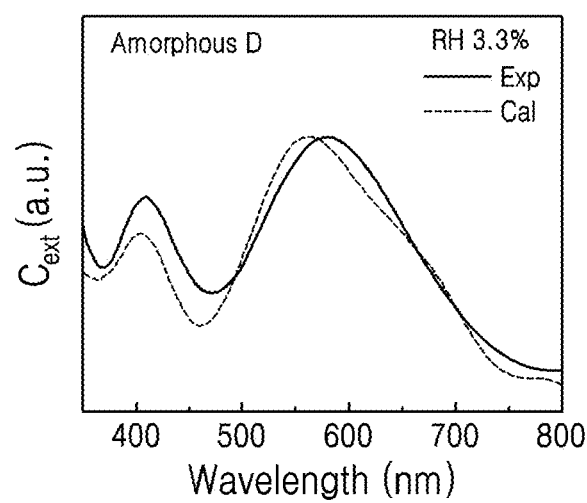
FIG. 5B shows measured and calculated total extinction cross sections as a function of wavelength, for an amorphous D set at 3.3% RH condition according to Example of the present disclosure.
Figure 5C:
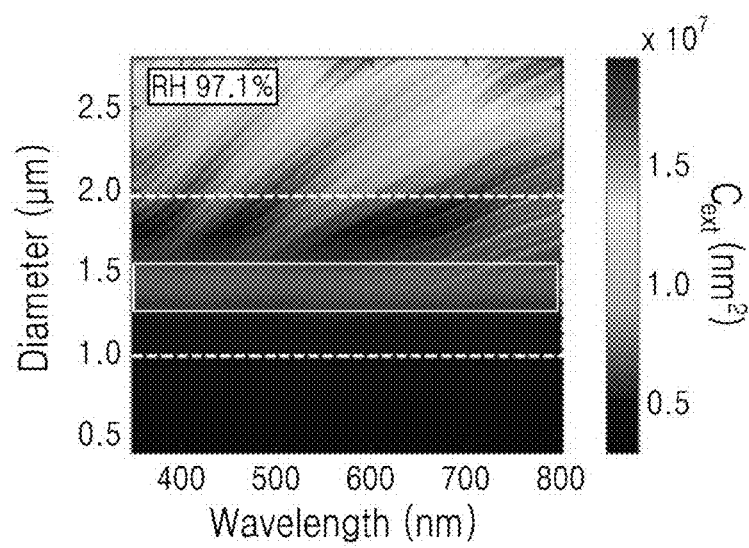
FIG. 5C shows calculated single particle extinction cross sections, as a function of wavelength and diameter superimposed with the size distribution, shown by the square drawn with white solid lines.
Figure 5D:
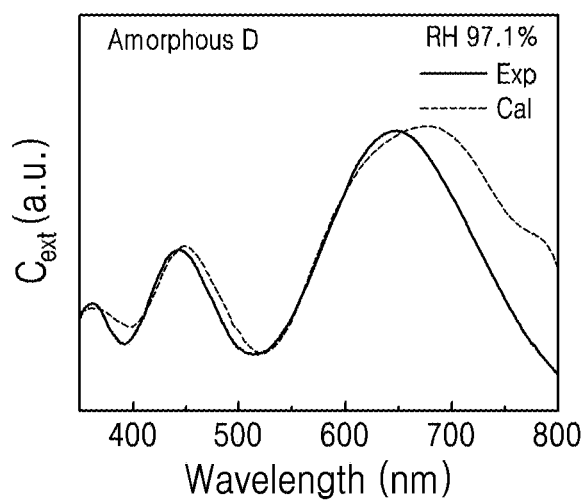
FIG. 5D shows measured and calculated total extinction cross sections as a function of wavelength, for an amorphous D set at 97.1% RH condition according to Example of the present disclosure.
Figure 6A:
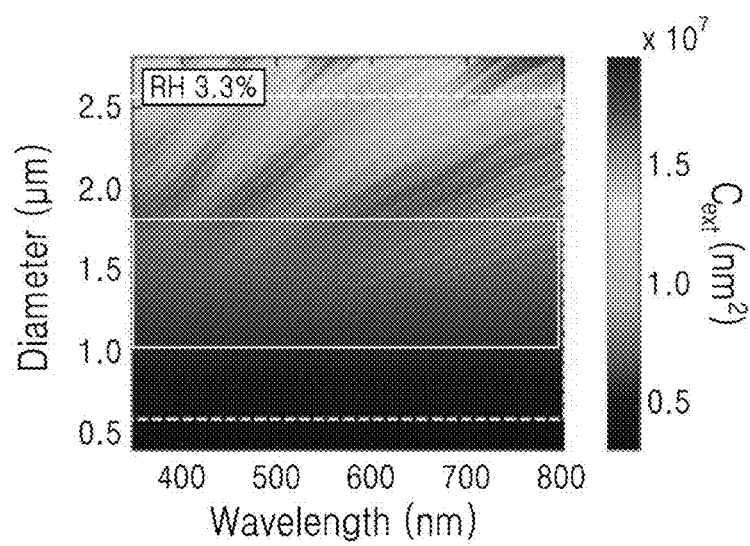
FIG. 6A shows calculated single particle extinction cross sections, as a function of wavelength and diameter superimposed with the size distribution, shown by the square drawn with white solid lines.
Figure 6B:
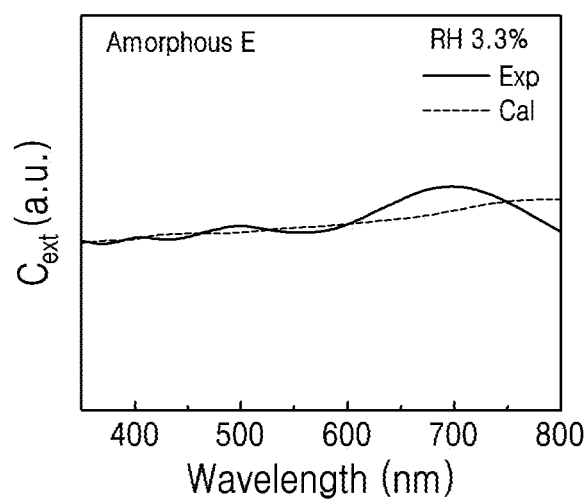
FIG. 6B shows measured and calculated total extinction cross sections as a function of wavelength, for an amorphous E set at 3.3% RH condition according to Example of the present disclosure.
Figure 6C:
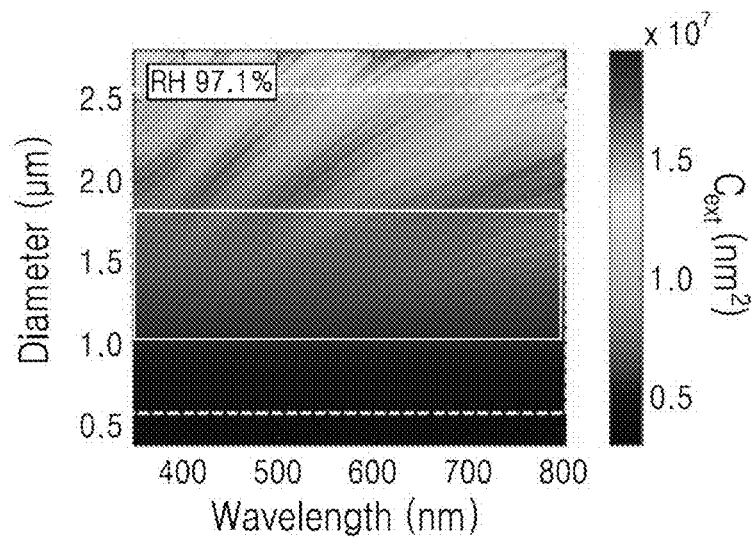
FIG. 6C shows calculated single particle extinction cross sections, as a function of wavelength and diameter superimposed with the size distribution, shown by the square drawn with white solid lines.
Figure 6D:
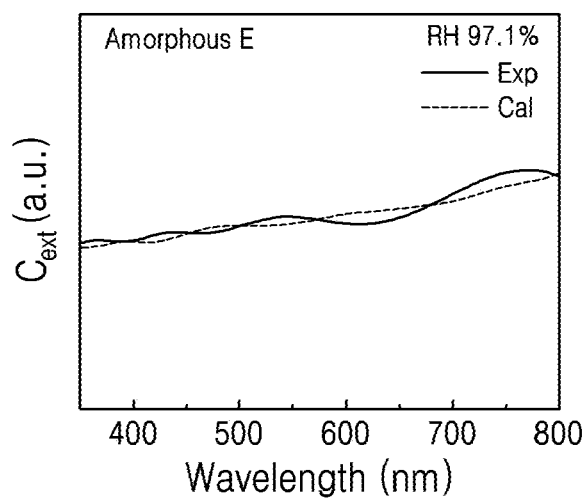
FIG. 6D shows measured and calculated total extinction cross sections as a function of wavelength, for an amorphous D set at 97.1% RH condition according to Example of the present disclosure.

In the present Example, the relation between pore volume filling and color change is described through analytical Mie calculations. FIG. 3A shows a schematic diagram of the scattering of light by a polydispersed collection of porous microspheres at 3.3% RH and 97.1% RH, representing the two extremes in measured RH values. Each microsphere comprises a complex network of nanocrystallites and pores in which water molecules can be accommodated. At 3.3% RH and 97.1% RH, the pores were considered to be completely filled by dry air and water, respectively. The assumption that water fully occupies the pore volume at 97.1% RH is validated later in the discussion of the effective permittivity. For the calculations, it was assumed that titania particles support negligible absorption in the visible range such that the extinction is equivalent to the scattering. Also, in the present Example, the random porous network was modeled as subwavelength spherical inclusions as shown in the insets of FIG. 4. As the pore sizes determined in FIG. 2C are orders of magnitude smaller than the visible wavelengths in titania, the extinction can be modeled using effective medium theory. The collective extinction spectra represent the sum of individual extinction cross sections from every microsphere in the set. FIG. 5A, FIG. 5B, FIG. 6A, and FIG. 6B show the calculated single-particle extinction cross sections as a function of wavelength and diameter for the D and E microspheres, respectively, at 3.3% RH. Overlaid on the calculated maps are the experimental size distributions, denoted by a square drawn with white solid lines whose range is defined by the dotted white box. By integrating the product between the size distribution and the size-dependent cross section over the diameters, the total extinction cross section can be obtained.

Figure 22:
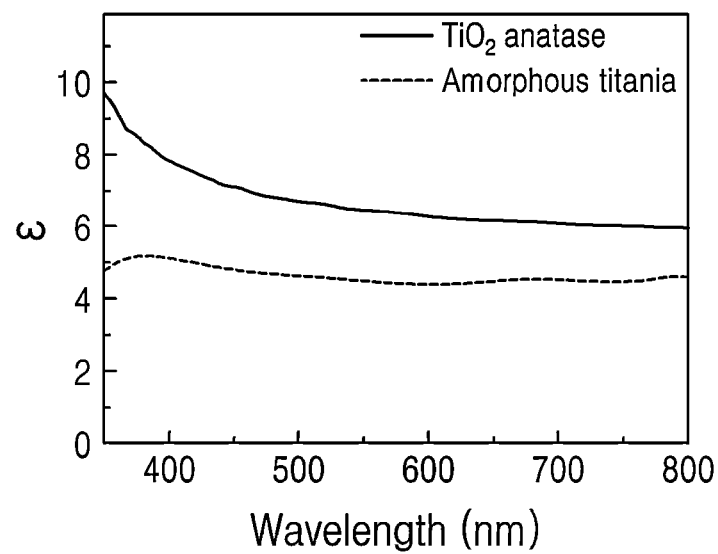
FIG. 22 is a graph showing the permittivity of anatase $TiO_2$ and amorphous titania as a function of wavelength according to Example of the present disclosure.
Figure 23A:
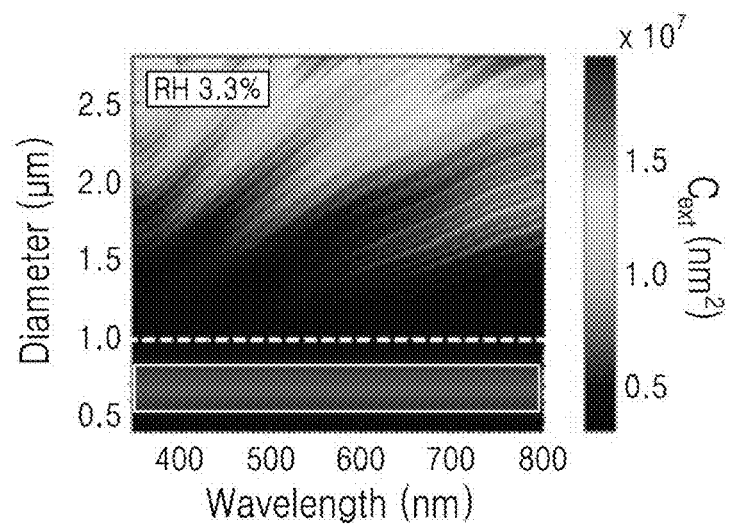
FIG. 23A shows calculated single particle extinction cross sections, as a function of wavelength and diameter superimposed with the size distribution, shown by the square drawn with white solid lines.
Figure 23B:
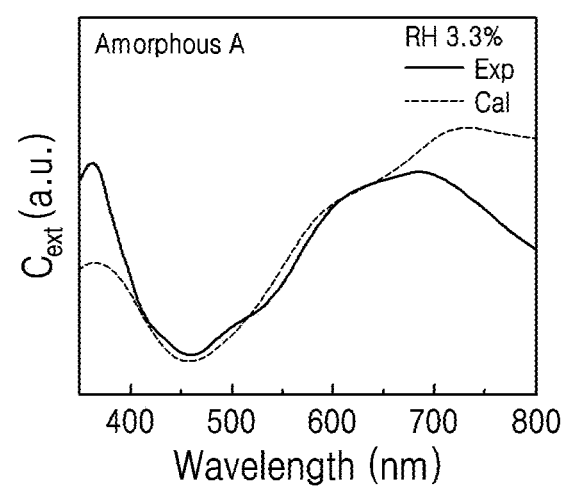
FIG. 23B shows measured and calculated total extinction cross sections as a function of wavelength, for an amorphous A set at 3.3% RH condition according to Example of the present disclosure.
Figure 23C:
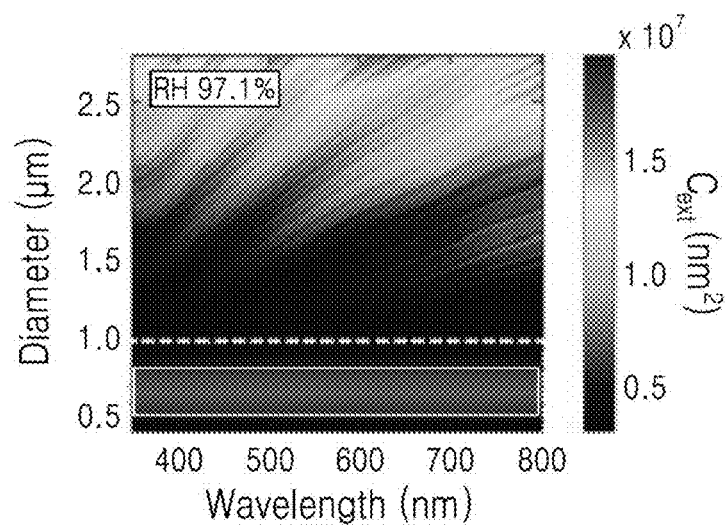
FIG. 23C shows calculated single particle extinction cross sections, as a function of wavelength and diameter superimposed with the size distribution, shown by the square drawn with white solid lines.
Figure 23D:
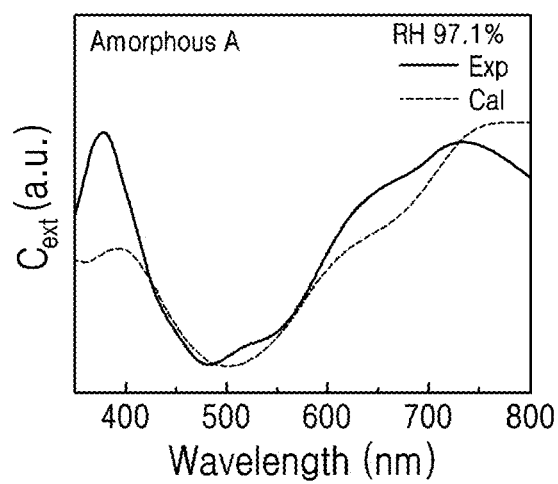
FIG. 23D shows measured and calculated total extinction cross sections as a function of wavelength, for an amorphous A set at 97.1% RH condition according to Example of the present disclosure.
Figure 24A:
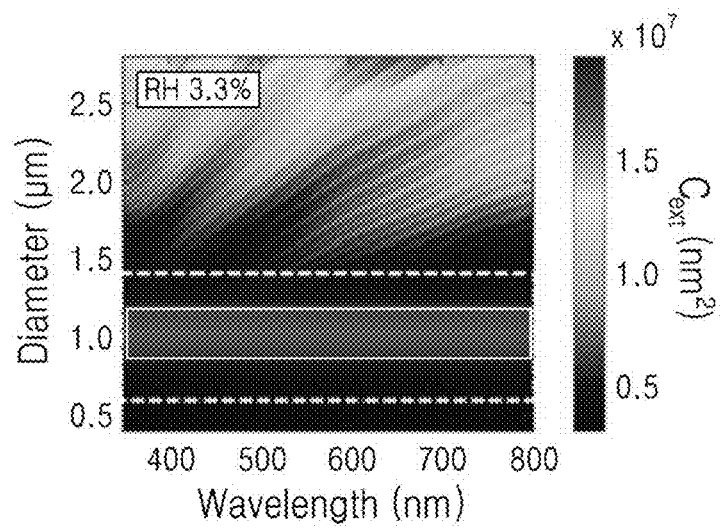
FIG. 24A shows calculated single particle extinction cross sections, as a function of wavelength and diameter superimposed with the size distribution, shown by the square drawn with white solid lines.
Figure 24B:
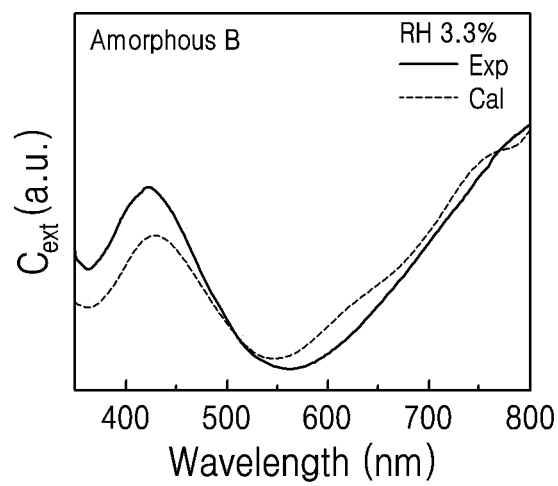
FIG. 24B shows measured and calculated total extinction cross sections as a function of wavelength, for an amorphous B set at 3.3% RH condition according to Example of the present disclosure.
Figure 24C:
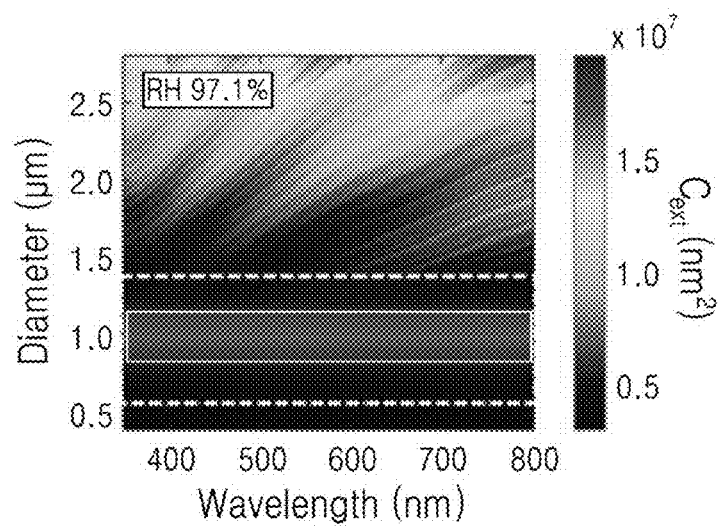
FIG. 24C shows calculated single particle extinction cross sections, as a function of wavelength and diameter superimposed with the size distribution, shown by the square drawn with white solid lines.
Figure 24D:
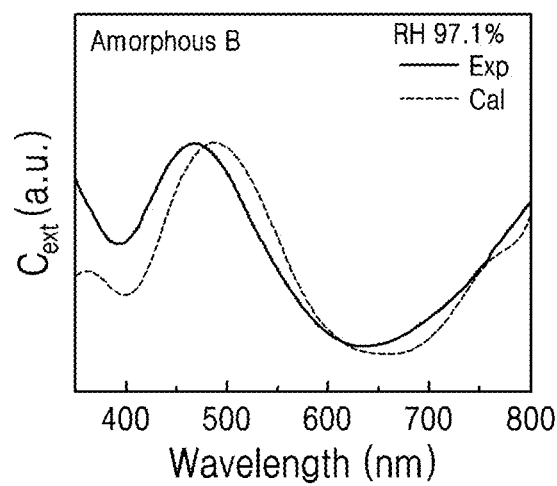
FIG. 24D shows measured and calculated total extinction cross sections as a function of wavelength, for an amorphous B set at 97.1% RH condition according to Example of the present disclosure.
Figure 25A:
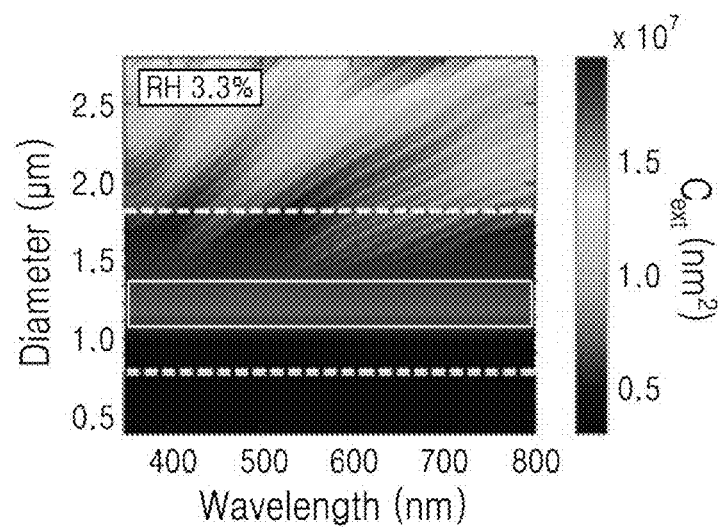
FIG. 25A shows calculated single particle extinction cross sections, as a function of wavelength and diameter superimposed with the size distribution, shown by the square drawn with white solid lines.
Figure 25B:
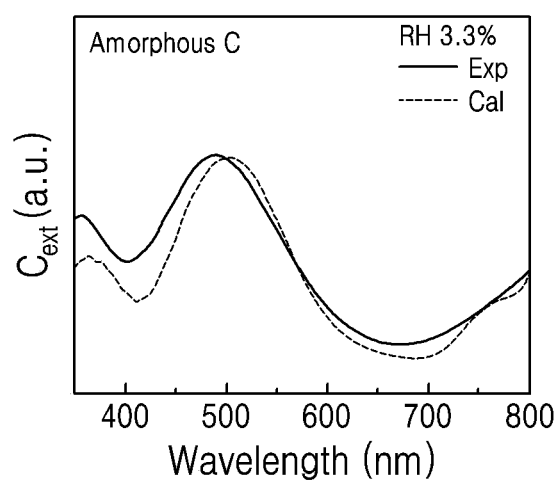
FIG. 25B shows measured and calculated total extinction cross sections as a function of wavelength, for an amorphous C set at 3.3% RH condition according to Example of the present disclosure.
Figure 25C:
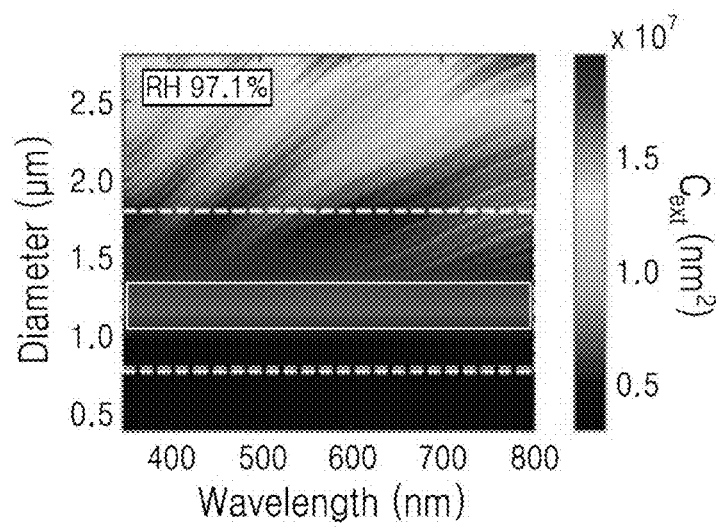
FIG. 25C shows calculated single particle extinction cross sections, as a function of wavelength and diameter superimposed with the size distribution, shown by the square drawn with white solid lines.
Figure 25D:
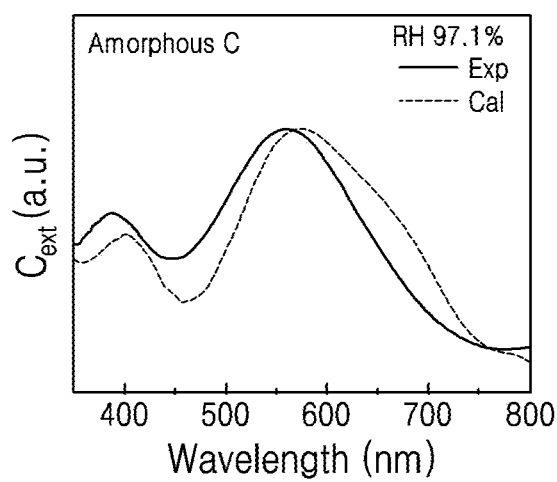
FIG. 25D shows measured and calculated total extinction cross sections as a function of wavelength, for an amorphous C set at 97.1% RH condition according to Example of the present disclosure.
Figure 26A:
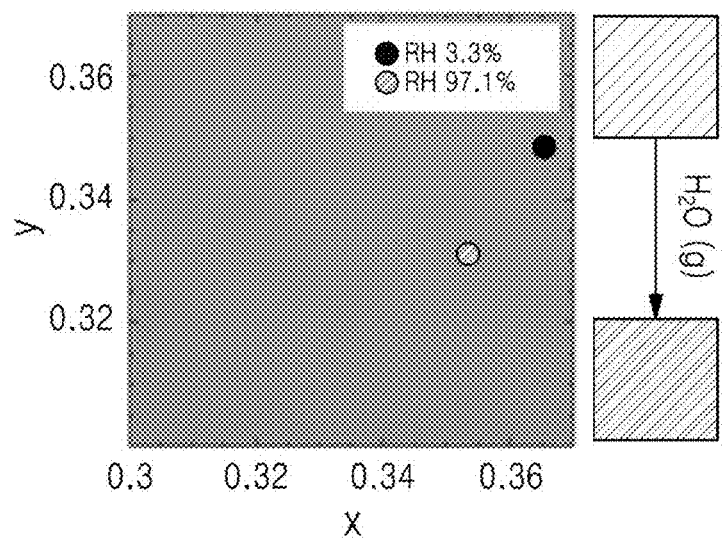
FIG. 26A shows CIE chromaticity diagram of A set at 3.3% RH and 97.1% RH (from beige to pink) according to Example of the present disclosure.
Figure 26B:
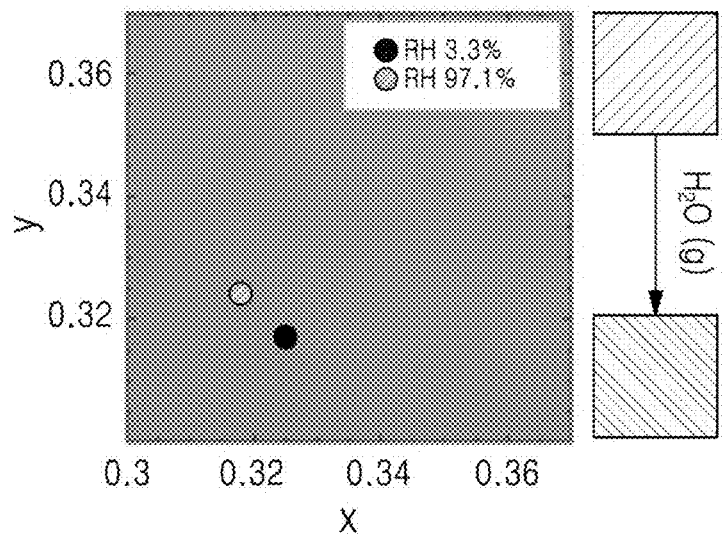
FIG. 26B shows CIE chromaticity diagram of B set at 3.3% RH and 97.1% RH (from lilac to sky blue) according to Example of the present disclosure.
Figure 26C:
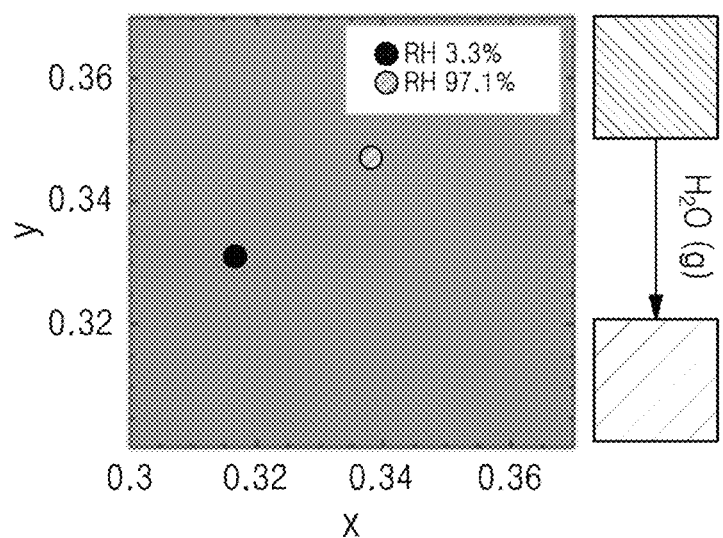
FIG. 26C shows CIE chromaticity diagram of C set at 3.3% RH and 97.1% RH (from sky blue to lemon) according to Example of the present disclosure.

To proceed with the calculations, the permittivity of the titania matrix and mass density of the microspheres were extracted first. Since the microsphere consists of a dense network of subwavelength pores in a titania matrix, the system can be treated as an effective medium using the Maxwell-Garnett formalism. The effective medium approach requires, as inputs, the porosity and the individual permittivities of titania and the occupied pores. The porosity can be found from the product of the density of the microsphere and specific volume ($cm^3/g$) obtained earlier through BET analysis (FIG. 2B and FIG. 2C). Although the permittivity of the titania and density of the microspheres are unknown, the five extinction spectra measured at 3.3% RH conditions present a system of constraints that suffice for extracting the two unknowns. In the present Example, a least-squares algorithm was performed to obtain the two variables. The extracted density of the microsphere was 2.1 $g/cm^3$ from which the porosity was found to be about 42%. Such a high porosity accounts for the substantial changes in the effective permittivity under fully dry and saturated humidity conditions. The permittivity of titania shown in FIG. 22 was on average 29.3% less than that of anatase $TiO_2$ over the visible wavelengths.

The calculated and measured spectra for the amorphous D and E sets at 3.3% RH show good agreement, as shown in FIG. 5A, FIG. 5B, FIG. 6A and FIG. 6B, respectively [see FIGS. 23A to 23D, FIGS. 24A to 24D, FIGS. 25A to 25D, and FIG. 26A to FIG. 26C for the A, B, and C sets. If the value of $C_{ext}$ becomes large ($\cong 10^7$), the color becomes red, and if the value of $C_{ext}$ becomes small ($\cong 0.5$), the color becomes blue]. As the five measured spectra at 97.1% RH present an independent set of constraints, they were used to check the validity of the extracted permittivity of titania and density of the microsphere. In all cases, the calculated results agree well with the measurements for all particle sets, verifying the accuracy of the extracted parameters, and further confirming the assumption that water fully occupies the pore volume at 97.1% RH conditions. Although the spectral shape shown in FIG. 5A to FIG. 5D resembles Fabry-Perot (FP) resonances, the spatially dispersed nature of the particles (see FIG. 19 and FIG. 20) and the polydispersed size distribution (see FIG. 1A (i) to FIG. 1E (ii)) prove that the particle set cannot constitute a well-defined thin film that supports coherent interference of reflected waves which induce FP resonances. Instead, as verified by calculations, the spectra are generated from incoherent scattering in the far-field of the particles in different sizes and populations.

Figure 7A:
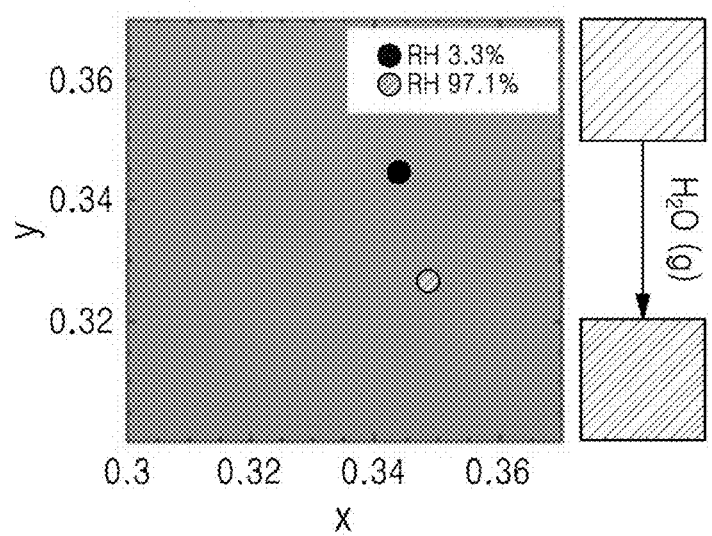
FIG. 7A shows CIE chromaticity diagram of D set at 3.3% RH and 97.1% RH according to Example of the present disclosure.
Figure 7B:
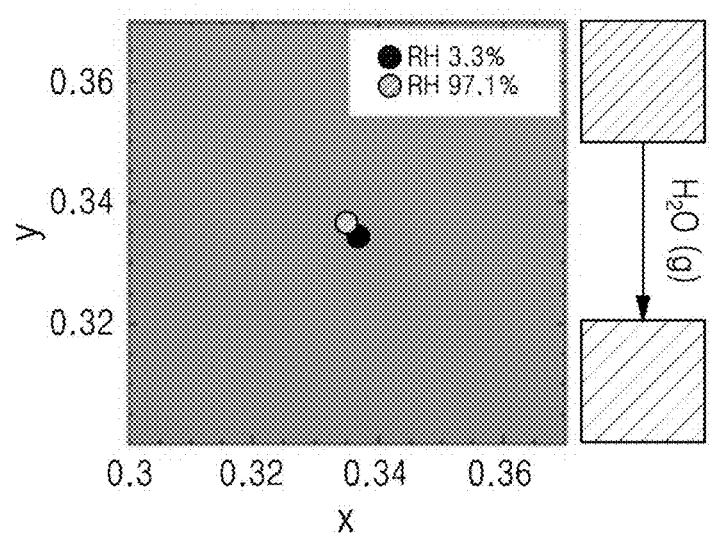
FIG. 7B shows CIE chromaticity diagram of E set at 3.3% RH and 97.1% RH according to Example of the present disclosure.

The importance of the size distribution in humidity-dependent color contrast is illustrated through the amorphous E set, which displays the widest size distribution among the all sets (full width half-maximum of about 0.74 μm). This spread in size suppresses the large spectral variations observed in the other sets, resulting in a flat curve (FIG. 6A to FIG. 6D) that corresponds to a highly desaturated color. FIG. 7A and FIG. 7B depict the CIE chromaticities from the structural colors for the amorphous D (FIG. 7A, from ivory to pink) and E (FIG. 7B) sets at 3.3% and 97.1% RH conditions. Even though water is present in the interior of the amorphous E microspheres, as determined earlier by FT-IR measurements (FIG. 3A to FIG. 3C), little change in the chromaticities between the two humidity conditions was observed (both colors of cases were ivory). This is attributed to the highly desaturated color or flat spectral response, which renders negligible color contrast despite undergoing spectral changes. On the other hand, the amorphous D set, which exhibits a narrower size distribution (FWHM of about 0.36 μm) displays clearly distinguishable colors between fully dry and humid environments. The colorimetric range, therefore, depends strongly on the size distribution, wherein excessive polydispersity severely limits the range.

Figure 8:
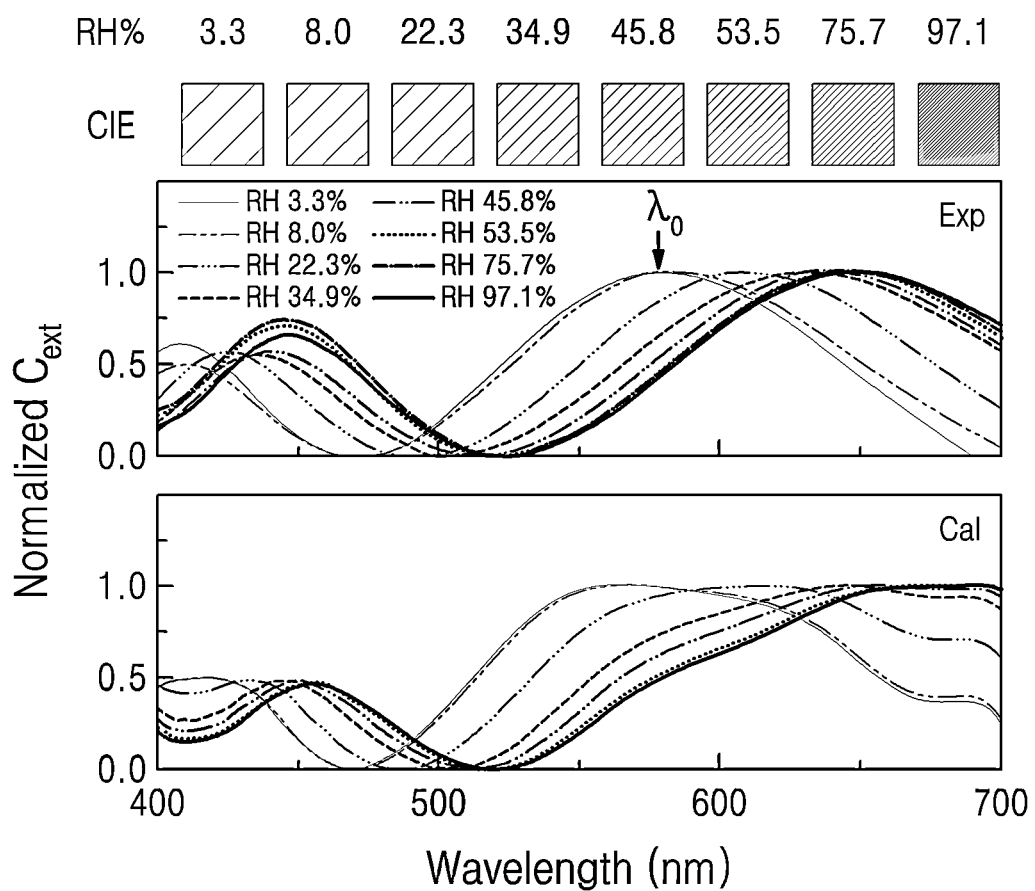
FIG. 8 shows the measured (top) and fitted (bottom) normalized extinction cross sections from 3.3% RH to 97.1% RH for the amorphous D set according to Example of the present disclosure, and $\lambda_0$ denotes the spectral position of a reference peak at 580 nm and CIE colors (changed gradually from ivory at RH 3.3% to pink at RH 97.1%) determined with the measured extinction cross sections from the respective RH values are shown on the uppermost side.
Figure 9:
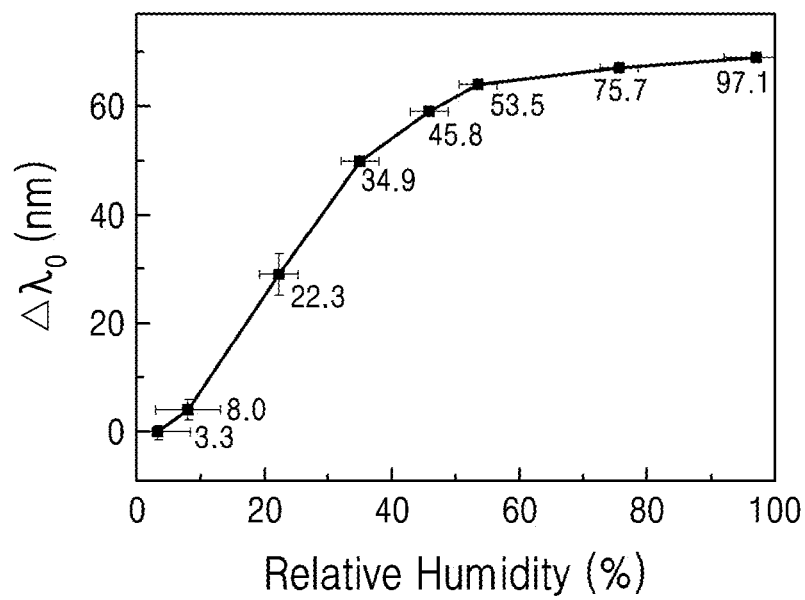
FIG. 9 shows measured peak shift relative to $\lambda_0$ for different RH values according to Example of the present disclosure.

Further, in the present Example, the pore volume filling process was examined to understand the critical RH at which water fully occupies the pore volume as this defines the colorimetric range and provides information on the maximum water uptake amount, normally acquired through gravimetric methods such as dynamic vapor sorption (DVS). In the present Example, the normalized extinction cross section was measured at several different RH conditions as shown in the top panel of FIG. 8. A general red shift in spectral features is observable for increased RH values. To quantify the spectral shift, the peak wavelength at 580 nm was selected from the extinction spectrum acquired at 3.3% RH as the reference wavelength, $\lambda_0$, and its shift for different RH values was plotted in FIG. 9. The peak shift reaches a constant value after about 53% RH, at which point it was presumed that the pore cannot accept more water vapor as it is completely occupied.

Figure 10:
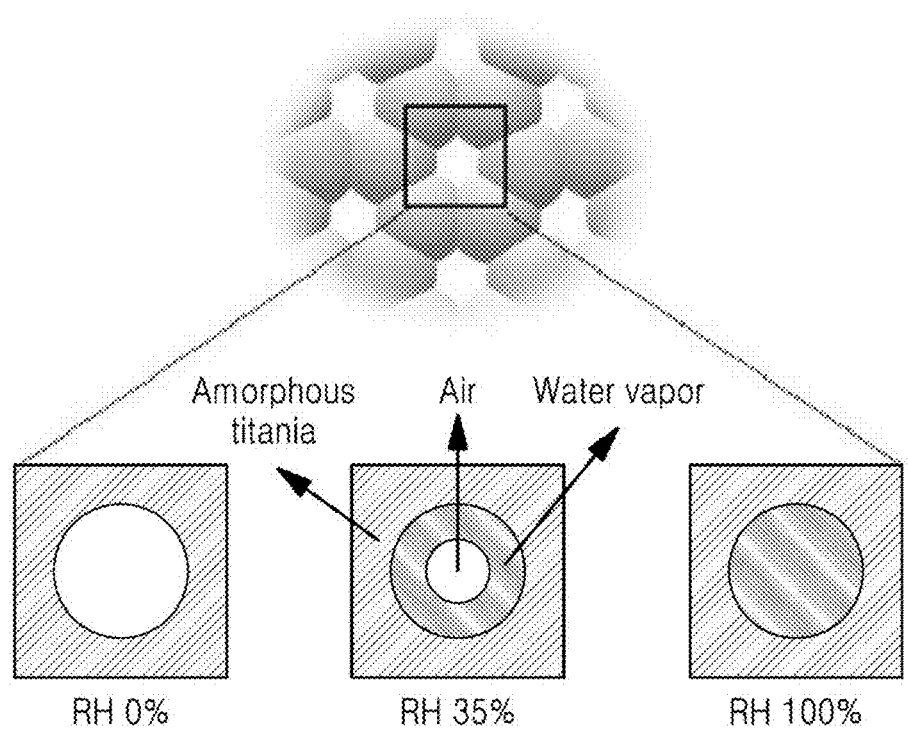
FIG. 10 is a schematic diagram of the pore volume filling model inside the amorphous titania matrix in different RH conditions according to Example of the present disclosure.
Figure 11:
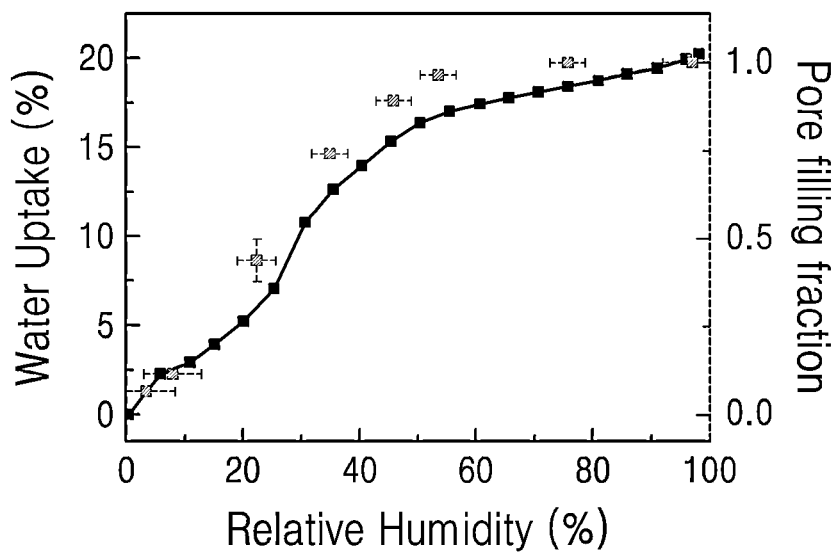
FIG. 11 is a graph showing water uptake percentages from DVS measurements (■) and calculated pore filling fraction (▨) for different RH values according to Example of the present disclosure.

The pore volume filling can be understood through a simple model schematically shown in FIG. 10. Since water molecules are highly polar and display a strong attraction to one another, it was assumed in the present Example that the water vapor forms, on the pore surface, a liquid shell that grows in volume as the humidity increases. An effective medium formalism that treats the air-liquid pores as core-shell inclusions was employed to obtain the effective permittivity. In the present Example, the pore filling fraction was obtained by finding optimized fits (see the bottom panel of FIG. 8) to the measured spectra with the least squares algorithm. FIG. 11 plots the calculated pore filling fraction at different RH conditions. The core-shell model verifies the earlier assumption that water occupies the full pore volume above 50% RH, as the pore filling fraction reaches unity above this value.

Since the pore filling fraction can be converted to the water uptake amount by taking its product with the microsphere porosity (42%), density of water (1 $g/cm^3$) and specific volume of the microsphere (0.197 $cm^3/g$), the pore filling fraction can be directly compared to the measured water uptake percentage obtained from DVS measurements, as shown in FIG. 11. It is possible to find good qualitative and quantitative agreement between measurement and calculation, which reinforces the validity of the core-shell model. The close quantitative agreement also indicates that we can neglect volume swelling of the microsphere upon water uptake as an additional mechanism for color contrast since this would alter the specific volume of the microspheres, resulting in larger deviations between the calculation and measurement. Further, in the present Example, the close agreement suggests that water uptake measurements on porous particles, which are critical for determining their hydroscopicity, can be effectively determined through optical measurements shown here with only a fraction of sample amount and time used in gravimetric measurements.

Figure 12:
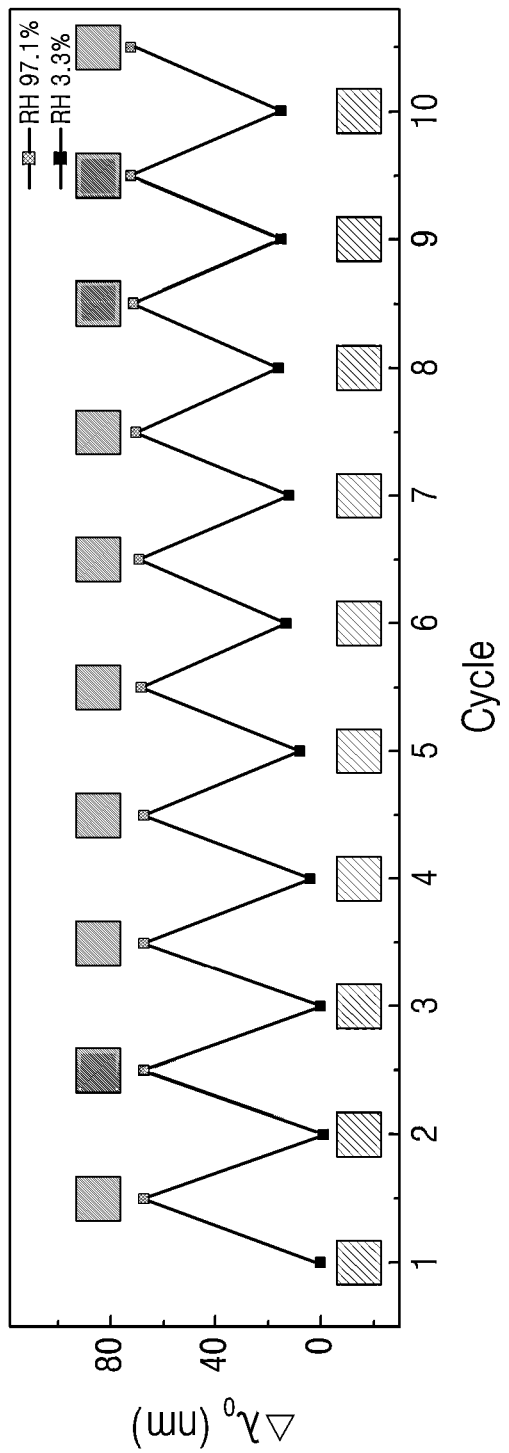
FIG. 12 shows measured peak shift relative to $\lambda_0$ at 3.3% RH to 97.1% RH conditions upon multiple cycles according to Example of the present disclosure.

The reversibility of the pore volume filling process was studied by repeatedly subjecting the microspheres to 3.3 and 97.1% RH cycles. FIG. 12 shows $\Delta\lambda_0$ under multiple cycles. Although the chromaticity appears relatively consistent through the multiple cycles as seen in the inset of FIG. 12 (mostly ivory at RH 3.3% and mostly pink at RH 97.1%), the peak shift values at 3.3% and 97.1% RH steadily increase from 0 nm and 67 nm to 10 nm and 72 nm at the $10^{th}$ cycle, respectively. The fact that the increase in peak shift for the dry condition is more drastic than that for the fully humid condition suggests that water does not fully desorb in dry conditions and remains in the pore presumably due to changes to the surface chemistry of the pores.

Figure 13A:
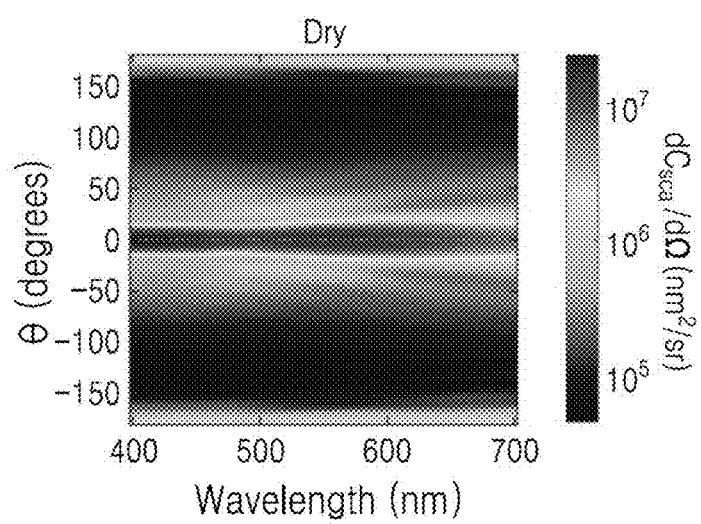
FIG. 13A shows calculated total differential scattering cross sections for the amorphous D set in dry condition according to Example of the present disclosure.
Figure 13B:
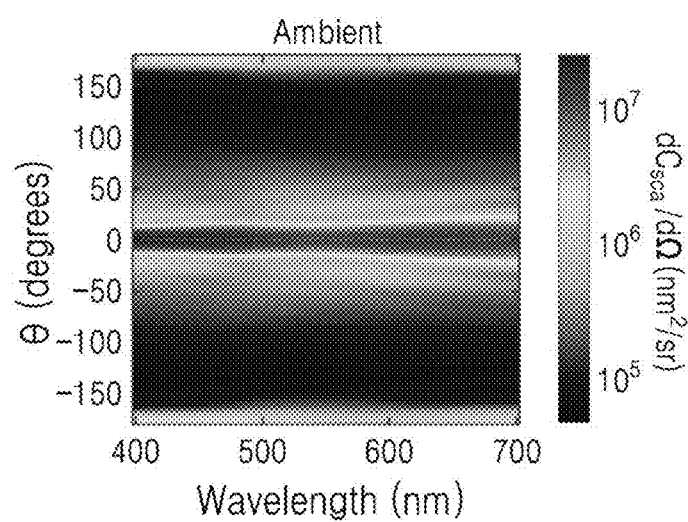
FIG. 13B shows calculated total differential scattering cross sections for the amorphous D set in ambient humidity condition according to Example of the present disclosure.
Figure 14:
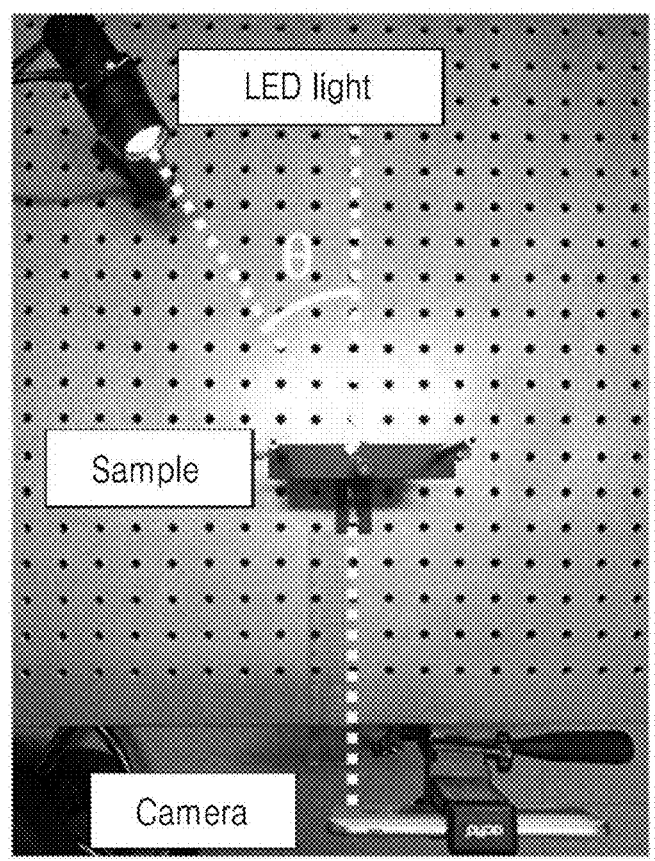
FIG. 14 is a photograph showing an experimental setup to evaluate the scattered colors as a function of illumination angle θ according to Example of the present disclosure, and the sample and camera are fixed in position while the illumination angle varies.

One consequence of the large size and refractive index of the microspheres is that their scattering is dominated by forward scattering. FIG. 13A and FIG. 13B depicts the calculated total differential scattering cross section from the microspheres as a function of angle and wavelength in dry and ambient conditions [If the value of $dC_{sca}/d\Omega$ becomes large ($\fallingdotseq 10^7$), the color becomes red, and if the value of $dC_{sca}/d\Omega$ becomes small ($\fallingdotseq 10^5$), the color becomes blue]. It can be seen that for both environments the scattering is peaked at 0° (red), corresponding to the forward direction (Blue toward −150° C. or 150° C.). The calculations was qualitatively corroborated by evaluating the colors in the two humidity conditions under different illumination angles as shown in FIG. 14. Here, the sample and camera are fixed in position while the illumination angle varies. FIGS. 15A-15R depict the color variation from the microspheres at several different illumination angles up to 26.6°. It can be seen that the scattered color appears strongest at 0°, as predicted by calculations (Dry condition: beige/Ambient condition: pink). At larger angles, the dry and ambient microspheres lose their color vibrancy as scattering weakens to the extent that the two humidity environments induce similar color impressions.

A primary strength offered by disordered structural colors is that color-generating devices can be fabricated easily and cheaply using solution-based methods as opposed to the case of ordered structural colors where complex lithographic methods are required. By spin coating titania particles onto transparent substrates, humidity-responsive colorimetric designs can be easily realized due to the lack of requirement on spatial order. Two Examples are illustrated in FIG. 16A (i) to FIG. 16B (iii), FIG. 17, and FIGS. 18A to 18H, where the background and simple icon image were prepared by spin coating separately particles unresponsive and responsive to the humidity, respectively. FIGS. 16A (i) to 16A (iii) depict a display that activates a green cactus when dry (Green is not active in ambient condition) and FIGS. 16B (i) to 16B (iii) depict a separate display that activates a blue rainy cloud when humid (Blue is not active in dry condition).

Figure 17:
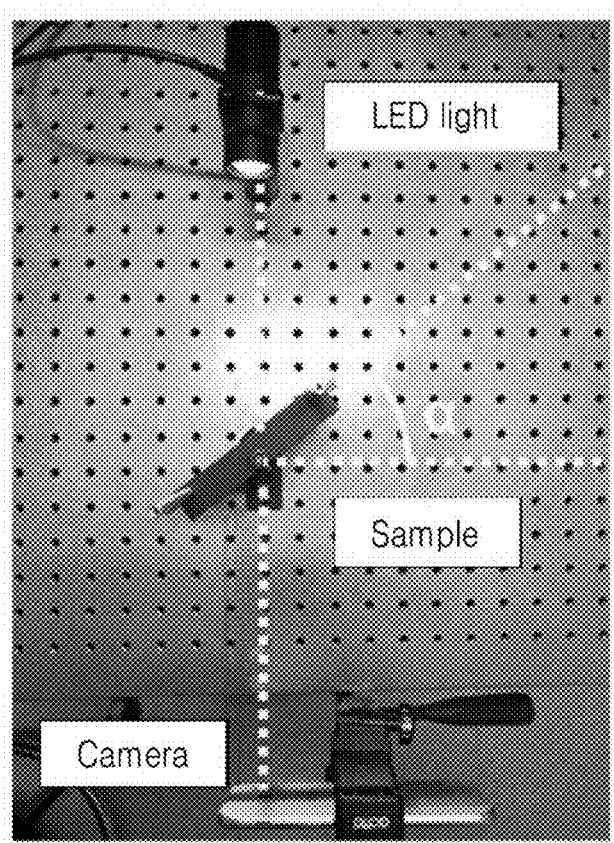
FIG. 17 is a photograph showing experimental setup to evaluate the scattering behavior of the particles under different sample rotation angles α according to Example of the present disclosure, and the illumination source and camera are optically aligned while the sample is rotated and the rotation angle changes the effective particle density in the beam path.

Optical microscopy analysis shows that the particle coverage only amounts to one to two monolayers. To evaluate the scattering behavior of the particles at different particle densities, the display was rotated under an aligned illumination and detection pathway, as shown in FIG. 17. At high rotation angles, the density of microspheres presented before the beam path increases, causing multiple scattering and color degradation. FIGS. 18A to 18H illustrate the rainy cloud icon rotated up to 60° with respect to the initial sample plane. It can be seen that for dry (Blue of the rainy cloud was not activated) and ambient (Blue of the rainy cloud was activated) conditions, the icon and background color contrast gradually decreases at larger rotation angles due to the apparent increase in particle density. This further illustrates that the optimum scattering contrast occurs at a microsphere coverage of only one to two monolayers, which signifies the need for only a marginal amount of material to produce saturated structural colors.

An additional key advantage supplied by the monolayer coverage is the fast response rates to humidity changes. The monolayer coverage implies that the particles are immediately exposed to water molecules in humid environments in contrast to the case where they are buried inside several layers of particles. Therefore, treatment of water molecule transport through several layers of particles can be excluded, and instead, the diffusion of water molecules into the porous network of an isolated sphere can be considered. The solution to Fick's second law of diffusion in spherical coordinates, subject to the infinite bath boundary conditions is presented. Although the minimum time required for the water molecules to distribute evenly across the entire particle ideally represents the response time, even when the particle center reaches 90% of the outer concentration, the effective permittivity is largely unaffected because the mass ratio relative to the equilibrium mass remains near unity (97%). Therefore, in the present Example, the minimum time for the concentration at the particle center to reach 90% of the input concentration was calculated as the response time. Previous studies on the diffusion and transport of molecules in porous networks have shown that the pore size governs the diffusion dynamics. For experimental pore sizes of from 1 nm to 2 nm, it is known that intracrystalline dynamics dominate, yielding diffusion constants in the range of from $D\tilde{~}10^{-7}$ m²/s to $10^{-12}$ m²/s. This range corresponds to the response time of from 0.37 μs to 37.2 ms for average diameter of 0.7 μm and from 1.49 μs to 149 ms for average diameter of 1.4 μm.

Figure 27:
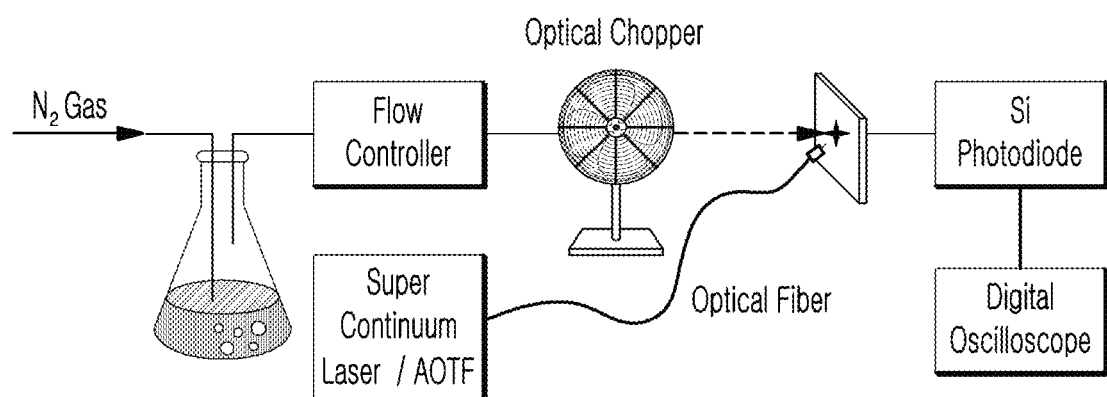
FIG. 27 is a schematic diagram showing time-resolved measurements on a humidity response according to Example of the present disclosure.

In the present Example, an ultrafast response rate of the microsphere was verified by measuring time-resolved humidity response measurements. FIG. 27 is a schematic diagram showing a setup for the present test. Pulses of humid $N_2$ flow generated by periodically modulating the output flow from a bubbler were delivered onto a monolayer of amorphous B particles (average diameter of ~1 μm) with RH values cycled between ~20% and ~90%. In the present Example, to probe the temporal response of the particles, the sample was illuminated with a supercontinuum laser tuned to a wavelength of 690 nm that was verified as generating the largest response to humidity changes. Temporal changes in the forward scattered signal were then detected by a Si photodiode with a ~2 ns rise time and monitored by an oscilloscope.

Figure 28:
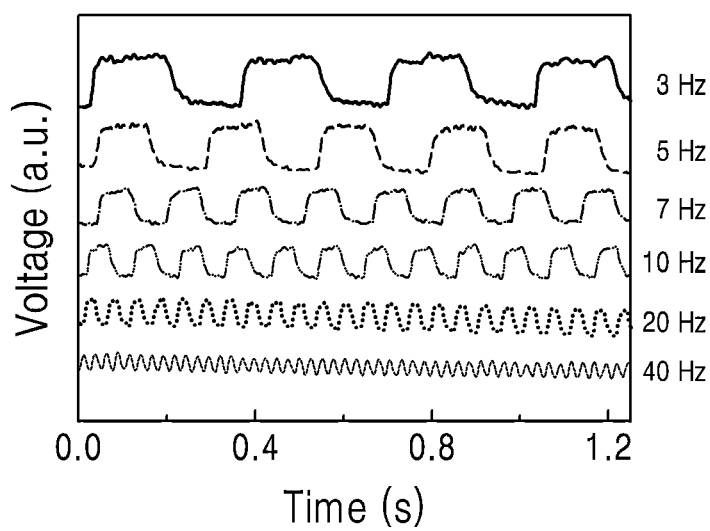
FIG. 28 shows output voltages from a Si photodiode showing changes in scattering at 690 nm by amorphous B particles subjected to different humidity modulation frequencies according to Example of the present disclosure.
Figure 29:
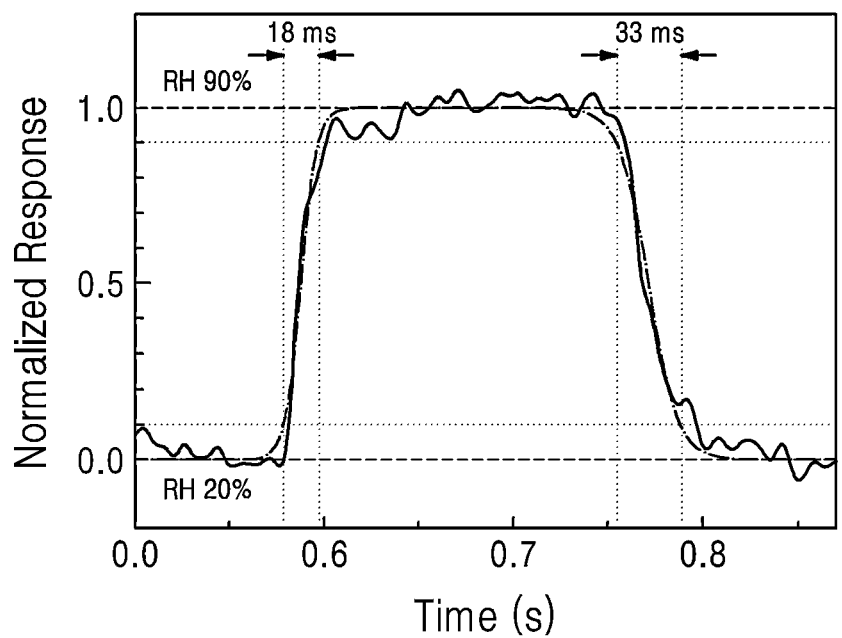
FIG. 29 is a graph showing an evaluation on the rise and recovery times of amorphous B particles according to Example of the present disclosure.

FIG. 28 shows the response times of the particle set subjected to different humidity modulation frequencies of from 3 Hz to 40 Hz. The rise (recovery) time is defined as the time interval for a signal to increase (decrease) from 10 (90)% to 90 (10)% of the saturated voltage. As can be seen from FIG. 29, the asymmetric S-shaped fit of the signal at 3 Hz under control conditions indicates the rise time and the recovery time of 18 ms and 33 ms, respectively. This value is similar to the conventional fastest response time (~30 ms) of a graphene oxide-based electrical humidity sensor and two to three orders of magnitude faster than an electrical sensor manufactured using a $TiO_2$ thin film. Since a cycle (25 ms) of the particle set at 40 Hz is shorter than the sum of the rise and recovery times, it can be seen that even if the response signal is not saturated any more, the response is fast enough to trace the modulation. By inputting the rise time of 18 ms into the above-described simple diffusion model, the diffusion coefficient of water molecules adsorbed into the porous titania microsphere can be estimated as $D\tilde{~}4.5\times10^{-12}$ m²/s which is suitable for the particle with a pore size of from 1 nm to 2 nm.

CONCLUSION

In summary, in the present Example, the use of amorphous titania microspheres in humidity-responsive colorimetric sensors was demonstrated. The amorphous titania microspheres exhibit negligible spatial order, and yet generate colorful scattered light that responds to different humidity conditions. Each microsphere individually scatters light that appears colorless, due to its noisy spectrum; however, a polydispersed collection of such microspheres scatters saturated colorful light due to the washing out of high frequency spectral noise and the exposing of smooth-varying spectral variations by the additive contributions of scattering from multiple particles of different sizes. In the present Example, through BET analysis, FT-IR, and optical calculations using an effective medium approach, it was conformed that the structural color contrast mechanism at different RH conditions originates from water molecule adsorbing and condensing in the highly porous titania network of the amorphous microspheres, which significantly changes the effective permittivity of the microspheres. The diffusion of the water molecules in the porous network is essentially fast and exhibits a response time of from 18 ms to 33 Ms. The response time is similar to that of a fastest electrical humidity sensor based on graphene oxide and is the fastest among the colorimetric sensors. Using extracted parameters, the water uptake was evaluated from a purely optical analysis using only a fraction of sample amount and time required by gravimetric analysis. This opens up promising pathways for using optical measurements on dielectric particles as an alternative and efficient approach for acquiring the water uptake. For cases where the material density and permittivity are known, this method also enables the porosity to be obtained. Furthermore, due to the lack of constraints on spatial order, the microspheres can be easily applied to colorimetric humidity-sensitive displays via spin coating. To this end, simple and ultrafast humidity-responsive icons were described and optimized both in speed and signal at only a monolayer coverage. These results point to practical and useful opportunities for exploiting disordered structural colors in ultrafast humidity sensitive applications.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method of preparing a colorimetric humidity sensor, comprising:
synthesizing amorphous microspheres by a non-aqueous solvothermal method to prepare humidity-responsive particles; and
coating the humidity-responsive particles in a monolayer on a transparent substrate to form a colorimetric member,
wherein the colorimetric humidity sensor comprises the colorimetric member including humidity-responsive particles configured in a disordered monolayer arrangement on the transparent substrate, and
wherein the colorimetric humidity sensor indicates a scattered color change according to humidity upon light irradiation when moisture is adsorbed in pores of the humidity-responsive particles.

2. The method of claim 1,
wherein the humidity-responsive particles are amorphous, porous, and polydispersed microspheres.

3. The method of claim 1,
wherein the humidity-responsive particles include at least one oxide,
wherein the at least one oxide includes at least one selected from $SiO_2$, $TiO_2$, $BaTiO_3$, $ZnO$, $Ta_2O_3$, $Nb_2O_3$, $CaO$, $Li_2O$, $SnO_2$, $Sb_2O_3$, $Sb_2O_4$, $As_2O_3$, $SrTiO_3$, $PbTiO_3$, or $CaTiO_3$.

4. The method of claim 1,
wherein an average diameter of the humidity-responsive particles is from 0.05 μm to 10 μm.

5. The method of claim 1,
wherein the amorphous microspheres are synthesized to have different average diameters, respectively.

6. The method of claim 1,
wherein the colorimetric member indicates a different color according to an average diameter of the humidity-responsive particles.

7. The method of claim 1, further comprising:
coating humidity-unresponsive particles in a monolayer on the substrate in a region of the substrate where the colorimetric member is not formed.

8. The method of claim 7,
wherein the humidity-unresponsive particles are nonporous crystalline particles.

9. The method of claim 1,
wherein the colorimetric humidity sensor further comprises a second colorimetric member including second humidity-responsive particles configured in a disordered monolayer arrangement on the transparent substrate in a region of the substrate where the colorimetric member is not formed,
wherein an average diameter of the second humidity-responsive particles is different from that of the humidity-responsive particles.

10. The method of claim 1,
wherein an average pore diameter of the humidity responsive particles is from 1 nm to 60 nm.

11. The method of claim 1,
wherein the colorimetric humidity sensor indicates a change in saturation of the color according to an angle of light irradiation.

12. The method of claim 1,
wherein the color change of the colorimetric humidity sensor upon light irradiation is measured by an optical measuring instrument using at least one selected from a photodiode, a charge coupled device (CCD), and a complementary metal oxide semiconductor (CMOS).

13. The method of claim 1,
wherein the color change is observed within a narrow range of polydispersity having a full width half maximum (FWHM) about 0.36 μm, wherein the polydispersity is expressed as the FWHM.

14. The method of claim 1,
wherein the color change is indistinguishable in a wide range of polydispersity having a full width half maximum (FWHM) about 0.74 μm, wherein the polydispersity is expressed as the FWHM.

* * * * *